(12) United States Patent
Song et al.

(10) Patent No.: US 12,125,395 B2
(45) Date of Patent: Oct. 22, 2024

(54) NAVIGATION DEVICES

(71) Applicant: SZ DJI TECHNOLOGY CO., LTD., Shenzhen (CN)

(72) Inventors: Jianyu Song, Shenzhen (CN); Zhenzhou Lai, Shenzhen (CN); Yongkang Tao, Shenzhen (CN); Yiping Jiang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 719 days.

(21) Appl. No.: 17/060,650

(22) Filed: Oct. 1, 2020

(65) Prior Publication Data

US 2021/0020053 A1    Jan. 21, 2021

Related U.S. Application Data

(63) Continuation of application No. PCT/CN2018/081578, filed on Apr. 2, 2018.

(51) Int. Cl.
| | | |
|---|---|---|
| *G08G 5/00* | (2006.01) | |
| *B64C 39/02* | (2023.01) | |
| *G01C 19/5776* | (2012.01) | |
| *G01C 21/10* | (2006.01) | |
| *G01C 21/16* | (2006.01) | |
| *G05D 1/00* | (2006.01) | |
| *B64U 10/13* | (2023.01) | |

(52) U.S. Cl.
CPC ......... *G08G 5/0069* (2013.01); *B64C 39/024* (2013.01); *G01C 19/5776* (2013.01); *G01C 21/10* (2013.01); *G01C 21/1654* (2020.08); *G01C 21/1656* (2020.08); *G05D 1/101* (2013.01); *B64U 10/13* (2023.01)

(58) Field of Classification Search
CPC ............. G08G 5/0069; G01C 21/1654; G01C 21/1656; G01C 19/5776; G01C 21/10; B64C 39/024; G05D 1/101; B64U 10/13
See application file for complete search history.

(56) References Cited

U.S. PATENT DOCUMENTS

2009/0204276 A1    8/2009   Stuckman et al.

FOREIGN PATENT DOCUMENTS

| CN | 102834696 A | 12/2012 |
|---|---|---|
| CN | 103606206 A | 2/2014 |
| CN | 203759039 U | 8/2014 |
| CN | 107209514 A | 9/2017 |

(Continued)

OTHER PUBLICATIONS

PCT International Search Report mailed Dec. 29, 2018, issued in corresponding International Application No. PCT/CN2018/081578 (2 pages).

(Continued)

*Primary Examiner* — Aryan E Weisenfeld
(74) *Attorney, Agent, or Firm* — ANOVA LAW GROUP, PLLC

(57) ABSTRACT

A movable object includes a plurality of actuation devices configured to move the movable object, a processor configured to control the actuation devices and the movements of the movable object, and at least one sensor. The sensor has a coordinate system not substantially in alignment with a coordinate system of the movable object. The sensor senses the state of the movable object and the processor controls the propulsion devices and the movements of the movable object based on the sensed state.

19 Claims, 17 Drawing Sheets

(56) References Cited

FOREIGN PATENT DOCUMENTS

JP          2005331265 A    12/2005
WO   WO 2017066927 A1   4/2017

OTHER PUBLICATIONS

Shim, et al. "Optimal configuration of Redundant Inertial Sensors for Navigation and FDI Performance," Sensors, vol. 10, No. 7, Jul. 2, 2010.

NAVIGATION DEVICES

CROSS-REFERENCE TO RELATED PATENT APPLICATIONS

This application is a continuation of International Application No. PCT/CN2018/081578, filed Apr. 2, 2018, which is hereby incorporated by reference in its entirety.

TECHNICAL FIELD

The present disclosure relates generally to navigation devices and, more particularly, to navigation devices with one or more sensors positioned for improved navigational measurements.

BACKGROUND

Movable objects, such as unmanned aerial vehicles ("UAV") (sometimes referred to as "drones", include pilotless aircraft of various sizes and configurations that can be remotely operated by a user and/or programmed for automated flight. UAVs may be configured to carry a payload, such as cargo, optical equipment (e.g., photo cameras, video cameras, etc.), sensory equipment, or other types of payload. UAVs may sometimes be controlled in conjunction with information gathered using sensory equipment, for example, to identify and follow or "track" targets, such as people, vehicles, moving objects, etc. The sensory equipment may be an inertia measurement system for detecting information of linear and/or angular acceleration and velocity of the UAV.

The inertia measurement system may include a micro-inertial measurement unit (MIMU) including, for example, a three-axis micro-electromechanical system (MEMS) acceleration sensor and/or a MEMS gyroscope to detect three-dimensional acceleration information and/or three-dimensional angular velocity. The MIMU may be mounted on a UAV or UAV component, such as on a carrier connected to the UAV. Posture, velocity, and position of the carrier may be obtained by a navigation solution based on the detected inertial information. Often limited by requirements related to size, power consumption, and cost of the MIMU, UAVs typically use MIMUs that are three-axis integrated commercial chips with relatively poor measurement accuracies and low measurement ranges. During flight of a UAV, acceleration vibrations with large amplitudes often occur in a vertical direction parallel the rotation axis of a motor, causing the conventional acceleration sensor's measurements to overshoot its active measurement range in the vertical direction, thereby saturating the output.

To improve the reliability of inertial measurement systems for UAVs, an inertial measurement system is often configured to include redundant MIMUs, e.g., a primary MIMU and second (backup) MIMU. In these systems, the orthogonal sensing axes of each MIMU are parallel to each other. When a fault is detected for the primary MIMU, the redundant MIMU is used to provide navigation information. This approach, however, does not fully utilize the redundant information from a plurality of acceleration/angular velocity sensors, is not conducive to fault detection and isolation, and its fault tolerance is not high.

Another possible approach for inertial measurement systems on UAVs employs a plurality of single-axis acceleration sensors/gyroscopes. By using multiple single-axis sensors, however, the separately-mounted sensors are not easily positioned orthogonally to each other and require a more complex mechanical mounting structure. Further, an inertial measurement system using multiple single-axis sensors requires a cumbersome procedure to calibrate each sensor depending on its mounting angle relative to the carrier.

Some inertial measurement systems for UAVs address the problems above by including acceleration sensors with larger measurement ranges and/or damping designs to reduce the sensor's saturation due to vibration accelerations during flight. These systems, however, increase the cost of MIMU and the complexity of the inertial measurement system.

SUMMARY

The methods and systems for mounting an inertial measurement unit, such as an MIMU, disclosed herein overcome disadvantages of conventional systems. In one aspect, a movable object includes a plurality of actuation devices configured to move the movable object, a processor configured to control the actuation devices and the movements of the movable object, and at least one sensor. The sensor has a coordinate system not substantially in alignment with a coordinate system of the movable object. The sensor senses the state of the movable object and the processor controls the propulsion devices and the movements of the movable object based on the sensed state.

In another aspect, a movable object includes a plurality of actuation devices configured to move the movable object, a processor configured to control the actuation devices and the movements of the movable object, and at least one sensor, wherein the positioning of the at least one sensor provides for one or more of an improved navigation, an improved fault tolerance, and an improved measurement range in a certain direction. The at least one sensor senses the state of the movable object and the processor controls the propulsion devices and the movements of the movable object based on the sensed state.

In yet another aspect, a movable object includes a plurality of actuation devices configured to move the movable object, a processor configured to control the actuation devices and the movements of the movable object, and at least one sensor mounted on an adjustable platform. The at least one sensor senses the state of the movable object and the processor controls the propulsion devices and the movements of the movable object based on the sensed state. The processor is configured to cause adjustment of the platform based on one or more requirements for the at least one sensor.

In still another aspect, a method is provided for positioning at least one sensor in a movable object that includes identifying one or more requirements for the at least one sensor, determining a positioning matrix based on the one or more requirements, and positioning the at least one sensor based on the positioning matrix.

DETAILED DESCRIPTION

Figure 1:
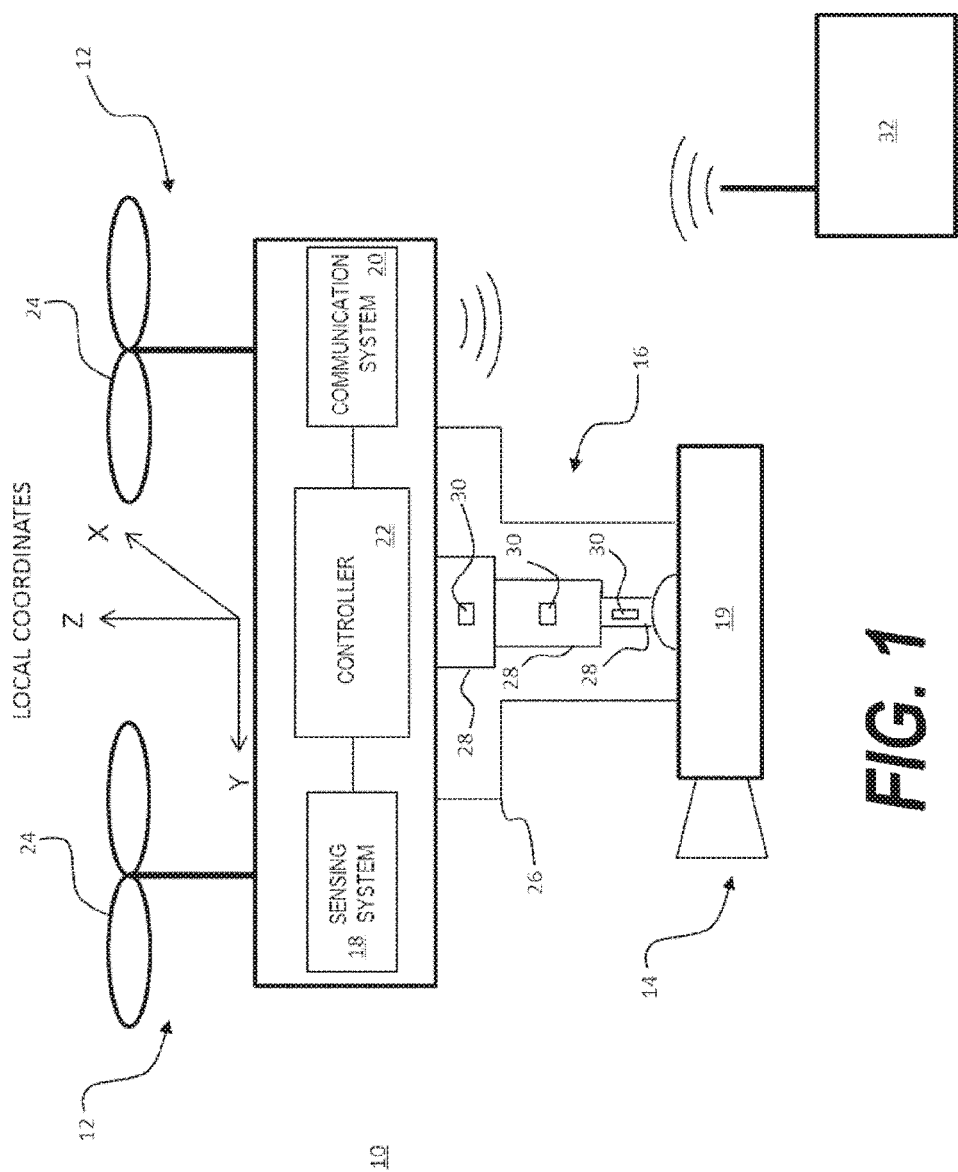
FIG. 1 is a diagram of an exemplary movable object, including a carrier and a payload, and a remote control terminal, consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure provides navigation devices or systems with one or more sensors integrated in such a way to optimize or maximize measurement range, precision, and reliability. Consistent with the disclosed embodiments, a navigation device may include one or more sensors such as two-axis or three-axis accelerometers, gyroscopes, compasses, etc. The navigation device may be mounted on a movable object (such as a UAV), or a carrier, including but not limited to a gimbal, frame, support, or any other physical structure, to provide inertial measurements to facilitate navigation. The navigation device may comprise a single MEMS chip, into which the one or more multi-axis sensors are integrated. When the navigation device includes multiple sensors, the sensors may be on separate chips that are bonded together, or fixed together through any other rigid structure.

In the navigation device, one or more of the multi-axis sensors may be positioned with respect to the movable object or with respect to each other, to improve measurement range, measurement precision, and fault tolerance, as well as reduce the need for vibration reduction (e.g., damping).

Although the following exemplary embodiments are described in the context of a movable object, such as a UAV, it is contemplated that other implementations are possible and alternative embodiments may be deployed without using a UAV. For example, the systems and methods disclosed herein may be implemented using various vibrating or rotating systems, for example on moving or stationary objects, or as part of a larger system consistent with the disclosed embodiments.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc). For example, movable object 10 may be a UAV. Although movable object 10 is shown and described herein as a UAV for exemplary purposes of this description, it is understood that other types of movable object (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include one or more actuation devices, such as propulsion devices 12, and may be configured to carry a payload 14. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a sensing system 18, a communication system 20, and a controller 22 in communication with the other components.

Movable object 10 may include one or more (e.g., 1, 2, 3, 4, 5, 10, 15, 20, etc.) propulsion devices 12 positioned at various locations (for example, top, sides, front, rear, and/or bottom of movable object 10) for propelling and steering movable object 10. Propulsion devices 12 may be devices or systems operable to generate forces for sustaining controlled flight. Propulsion devices 12 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. Each propulsion device 12 may also include one or more rotary components 24 connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion devices 12 and/or rotary components 24 may be adjustable (e.g., tiltable) with respect to each other and/or with respect to movable object 10. Alternatively, propulsion devices 12 and rotary components 24 may have a fixed orientation with respect to each other and/or movable object 10. In some embodiments, each propulsion device 12 may be of the same type. In other embodiments, propulsion devices 12 may be of multiple different types. In some embodiments, all propulsion devices 12 be controlled in concert (e.g., all at the same speed and/or angle). In other embodiments, one or more propulsion devices may be independently controlled with respect to, e.g., speed and/or angle.

Propulsion devices 12 may be configured to propel movable object 10 in one or more vertical and horizontal directions and to allow movable object 10 to rotate about one or more axes. That is, propulsion devices 12 may be configured to provide lift and/or thrust for creating and maintaining translational and rotational movements of movable object 10. For instance, propulsion devices 12 may be configured to enable movable object 10 to achieve and maintain desired altitudes, provide thrust for movement in all directions, and provide for steeling of movable object 10. In some embodiments, propulsion devices 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion devices 12 may be configured to enable movement of movable object 10 along and/or about multiple axes.

Payload 14 may include one or more sensory devices 19. Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gather data that may be used to generate images. For example, imaging devices may include photographic cameras, video cameras, infrared imaging devices, ultraviolet imaging devices, x-ray devices, ultrasonic imaging devices, radar devices, etc. Sensory devices 19 may also or alternatively include devices for capturing audio data, such as microphones or ultrasound detectors. Sensory devices 19 may also or alternatively include other suitable sensors for capturing visual, audio, and/or electromagnetic signals. The imaging devices may be capable of performing auto focus on a target by adjusting focus length to image the target with a desirable image quality. The sensory devices 19 may include one or more distance measurement devices that measure distances from the imaging devices to targets. The distance measurement devices may implement a laser radar device, an ultrasonic device, and/or a combination thereof.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤π, ≤45°, ≤30°, ≤15°, etc.), about one or more of its axes.

Carrier 16 may include a frame assembly 26, one or more actuator members 28, and one or more carrier sensors 30. Frame assembly 26 may be configured to couple the payload 14 to the movable object 10 and, in some embodiments, allow payload 14 to move with respect to movable object 10. In some embodiments, frame assembly 26 may include one or more sub-frames or components movable with respect to each other. Actuation members 28 may be configured to drive components of frame assembly relative to each other to provide translational and/or rotational motion of payload 14 with respect to movable object 10. In other embodiments, actuator members 28 may be configured to directly act on payload 14 to cause motion of payload 14 with respect to frame assembly 26 and movable object 10. Actuator members 28 may be or include suitable actuators and/or force transmission components. For example, actuator members 28 may include electric motors configured to provide linear or rotation motion to components of frame assembly 26 and/or payload 14 in conjunction with axles, shafts, rails, belts, chains, gears, and/or other components.

Carrier sensors 30 may include devices configured to measure, sense, detect, or determine state information of carrier 16 and/or payload 14. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 16 or payload 14 with respect to movable object 10. Carrier sensors 30 may include one or more types of suitable sensors, such as potentiometers, optical sensors, visions sensors, magnetic sensors, motion or rotation sensors (e.g., gyroscopes, accelerometers, inertial sensors, etc.). Carrier sensors 30 may be associated with or attached to various components of carrier 16, such as components of frame assembly 26 or actuator members 28, or movable object 10. Carrier sensors 30 may be configured to communicate data and information with controller 22 via a wired or wireless connection (e.g., RFID, Bluetooth, radio, cellular, etc.). Data and information generated by carrier sensors 30 and communicated to controller 22 may be used by controller 22 for further processing, such as for determining state information of movable object 10 and/or targets.

Carrier 16 may be coupled to movable object 10 via one or more damping elements configured to reduce or eliminate undesired shock or other force transmissions to payload 14 from movable object 10. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate payload 14 from movable object 10 and/or dissipate force propagations from movable object 10 to payload 14. Damping elements may also include mechanisms or devices configured to provide damping effects, such as pistons, springs, hydraulics, pneumatics, dashpots, shock absorbers, and/or other devices or combinations thereof.

Sensing system 18 may include one or more sensors associated with one or more components or other systems of movable device 10. For instance, sensing system may include sensors for determining positional information, velocity information, and acceleration information relating to movable object 10 and/or targets. In some embodiments, sensing system may also include carrier sensors 30. Components of sensing system 18 may be configured to generate data and information that may be used (e.g., processed by controller 22 or another device) determine additional information about movable object 10, its components, or its targets. Sensing system 18 may include one or more sensors for sensing one or more aspects of movement of movable object 10. For example, sensing system 18 may include sensory devices associated with payload 14 as discussed above and/or additional sensory devices, such as a positioning sensor for a positioning system (e.g., GPS, GLONASS, Galileo, Beidou, GAGAN, RTK, etc.), motion sensors, inertial sensors (e.g., IMU sensors, MIMU sensors, etc.), proximity sensors, image sensors, etc. Sensing system 18 may also include sensors or be configured to provide data or information relating to the surrounding environment, such as weather information (e.g., temperature, pressure, humidity, etc.), lighting conditions (e.g., light-source frequencies), air constituents, or nearby obstacles (e.g., objects, structures, people, other vehicles, etc.).

Communication system 20 may be configured to enable communications of data, information, commands, and/or other types of signals between controller 22 and off-board entities. Communication system 20 may include one or more components configured to send and/or receive signals, such as receivers, transmitter, or transceivers that are configured to carry out one- or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communications between devices for providing input for controlling movable object 10 during flight, such as a control terminal ("terminal") 32.

Terminal 32 may be configured to receive input, such as input from a user (i.e., user input), and communicate signals indicative of the input to controller 22. Terminal 32 may be configured to receive input and generate corresponding signals indicative of one or more types of information, such as control data (e.g., signals) for moving or manipulating movable device 10 (e.g., via propulsion devices 12), payload 14, and/or carrier 16. Terminal 32 may also be configured to receive data and information from movable object 10, such as operational data relating to, for example, positional data, velocity data, acceleration data, sensory data, and other data and information relating to movable object 10, its components, and/or its surrounding environment. Terminal 32 may be a remote control with physical sticks, levers, switches, and/or buttons configured to control flight parameters, or may be or include a touch screen device, such as a smartphone or a tablet, with virtual controls for the same purposes, and may employ an application on smartphone or a tablet, or a combination thereof.

In some embodiments, terminal 32 may be a smart eyeglass. As used herein, the smart eyeglass may include any wearable computer glasses or other wearable item that can provide additional information to an image or scene that a wearer sees. The smart eyeglass may include an optical head-mounted display (OHMD) or embedded wireless glasses with transparent heads-up display (HUD) or augmented reality (AR) overlay that has the capability of reflecting projected digital images as well as allowing the user to see through it, or see better with it. The smart eyeglass may serve as a front end display for images, videos, and other data or information received from the movable object 10, for example, via cellular technology or Wi-Fi. In some embodiments, the smart eyeglass may also control the movable object 10 via natural language voice commands and/or use of touch buttons on the smart eyeglass.

Figure 2B:
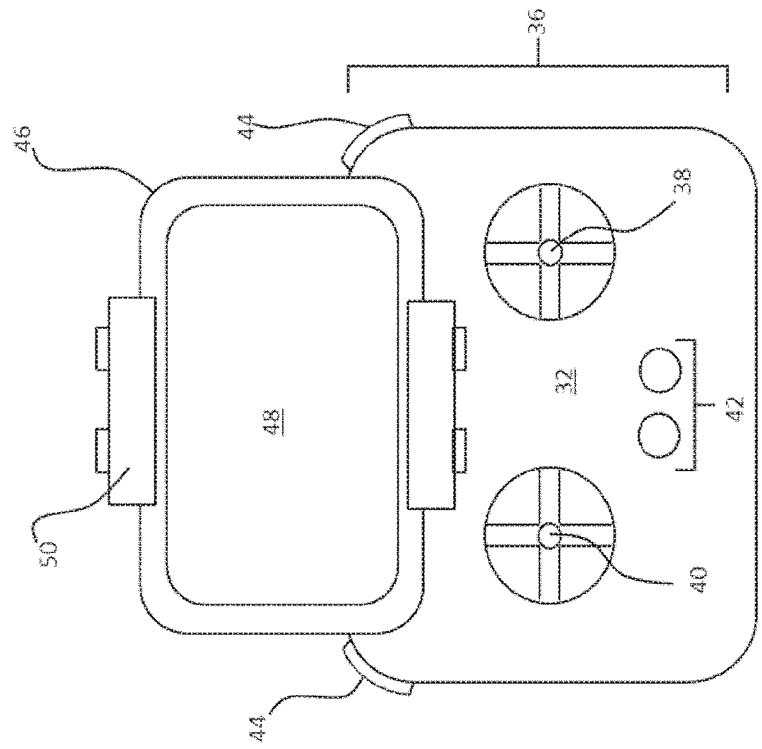
FIGS. 2A and 2B are diagrams of exemplary control terminals that may be used with embodiments consistent with the present disclosure.
Figure 2A:
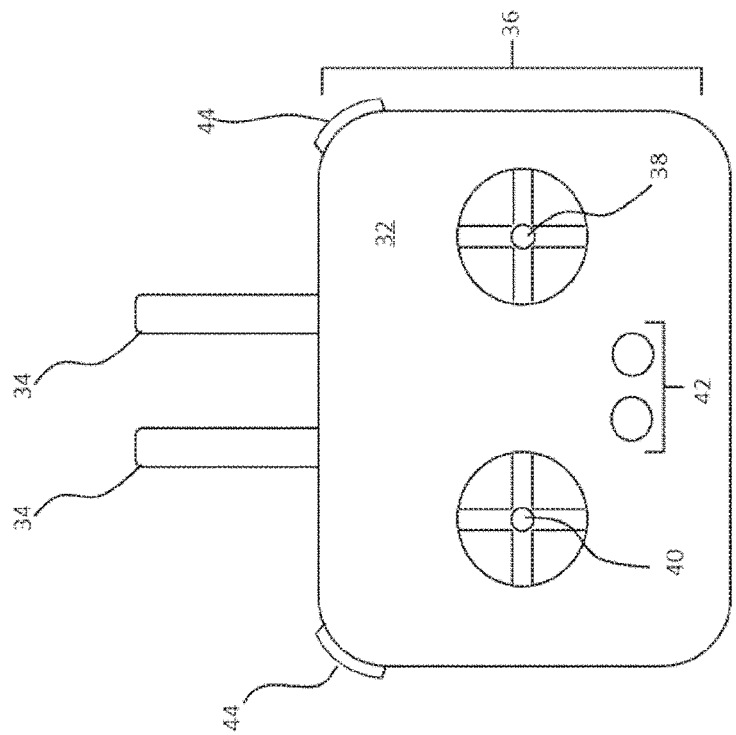

In the example shown in FIGS. 2A and 2B, terminal 32 may include communication devices 34 that facilitate communication of information between terminal 32 and other entities, such as movable object 10 or another terminal 32. Communication devices 34 may include antennae or other devices configured to send or receive signals. Terminal 32 may also include one or more input devices 36 configured to receive input from a user for communication to movable object 10. FIG. 2A shows one exemplary embodiment of terminal 32 having an input device 36 with a plurality of input devices 38, 40, 42, and 44 configured to receive user inputs indicative of desired movements of movable object 10 or its components. It is understood, however, that other possible embodiments or layouts of terminal may be possible and are within the scope of this disclosure.

Terminal 32 may include input devices, such as input levers 38 and 40, buttons 42, triggers 44, and/or other types of input devices for receiving one or more inputs from the user. Each input device of terminal 32 may be configured to generate an input signal communicable to controller 22 and usable by controller 22 as inputs for processing. In addition to flight control inputs, terminal 32 may be used to receive user inputs of other information, such as manual control settings, automated control settings, control assistance settings etc., which may be received, for example, via buttons 42 and/or triggers 44. It is understood that terminal 32 may include other or additional input devices, such as buttons, switches, dials, levers, triggers, touch pads, touch screens, soft keys, a mouse, a keyboard, a voice recognition device, and/or other types of input devices.

As shown in FIG. 2B, terminal 32 may also include a display device 46 configured to display and/or receive information to and/or from a user. For example, terminal 32 may be configured to receive signals from movable object 10, which signals may be indicative of information or data relating to movements of movable object 10 and/or data (e.g., imaging data) captured using movable object 10 (e.g., in conjunction with payload 14). In some embodiments, display device 46 may be a multifunctional display device configured to display information on a multifunctional screen 48 as well as receive user input via the multifunctional screen 48. For example, in one embodiment, display device 46 may be configured to receive one or more user inputs via multifunctional screen 48. In another embodiment, multifunctional screen 48 may constitute a sole input device for receiving user input.

In some embodiments, terminal 32 may be or include an interactive graphical interface for receiving one or more user inputs. That is, terminal 32 may provide a graphical user interface (GUI) and/or include one or more graphical versions of input devices 36 for receiving user input. Graphical versions of terminal 32 and/or input devices 36 may be displayable on a display device (e.g., display device 46) or a multifunctional screen (e.g., multifunctional screen 48) and include graphical features, such as interactive graphical features (e.g., graphical buttons, text boxes, dropdown menus, interactive images, etc.). For example, in one embodiment, terminal 32 may include graphical representations of input levers 38 and 40, buttons 42, and triggers 44, may be displayed on and configured to receive user input via multifunctional screen 48. In some embodiments, terminal 32 may be configured to receive all user inputs via graphical input devices, such as graphical versions of input devices 36. Terminal 32 may be configured to generate graphical versions of input devices 36 in conjunction with a computer application (e.g., an "app") to provide an interactive interface on the display device or multifunctional screen of any suitable electronic device (e.g., a cellular phone, a tablet, etc.) for receiving user inputs.

In some embodiments, display device 46 may be an integral component of terminal 32. That is, display device 46 may be attached or fixed to terminal 32. In other embodiments, display device may be connectable to (and disconnectable from) terminal 32. That is, terminal 32 may be configured to be electronically connectable to display device 46 (e.g., via a connection port or a wireless communication link) and/or otherwise connectable to terminal 32 via a mounting device 50, such as by a clamping, clipping, clasping, hooking, adhering, or other type of mounting device.

In some embodiments, terminal 32 may be configured to communicate with electronic devices configurable for controlling movement and/or other operational aspects of movable object 10. For example, display device 46 may be a display component of an electronic device, such as a cellular phone, a tablet, a personal digital assistant, a laptop computer, or other device. In this way, users may be able to incorporate the functionality of other electronic devices into aspects of controlling movable object 10, which may allow for more flexible and adaptable control schemes to be used. For example, terminal 32 may be configured to communicate with electronic devices having a memory and at least one processor, and can be used to provide user input via input devices associated with the electronic device (e.g., a multifunctional display, buttons, stored apps, web-based applications, etc.). Communication between terminal 32 and electronic devices may also be configured to allow for software update packages and/or other information to be received and then communicated to controller 22 (e.g., via communication system 20).

It is noted that other control conventions that relate inputs received via terminal 32 to desired or actual movements of movable device 10 may be used, if desired.

Figure 3:
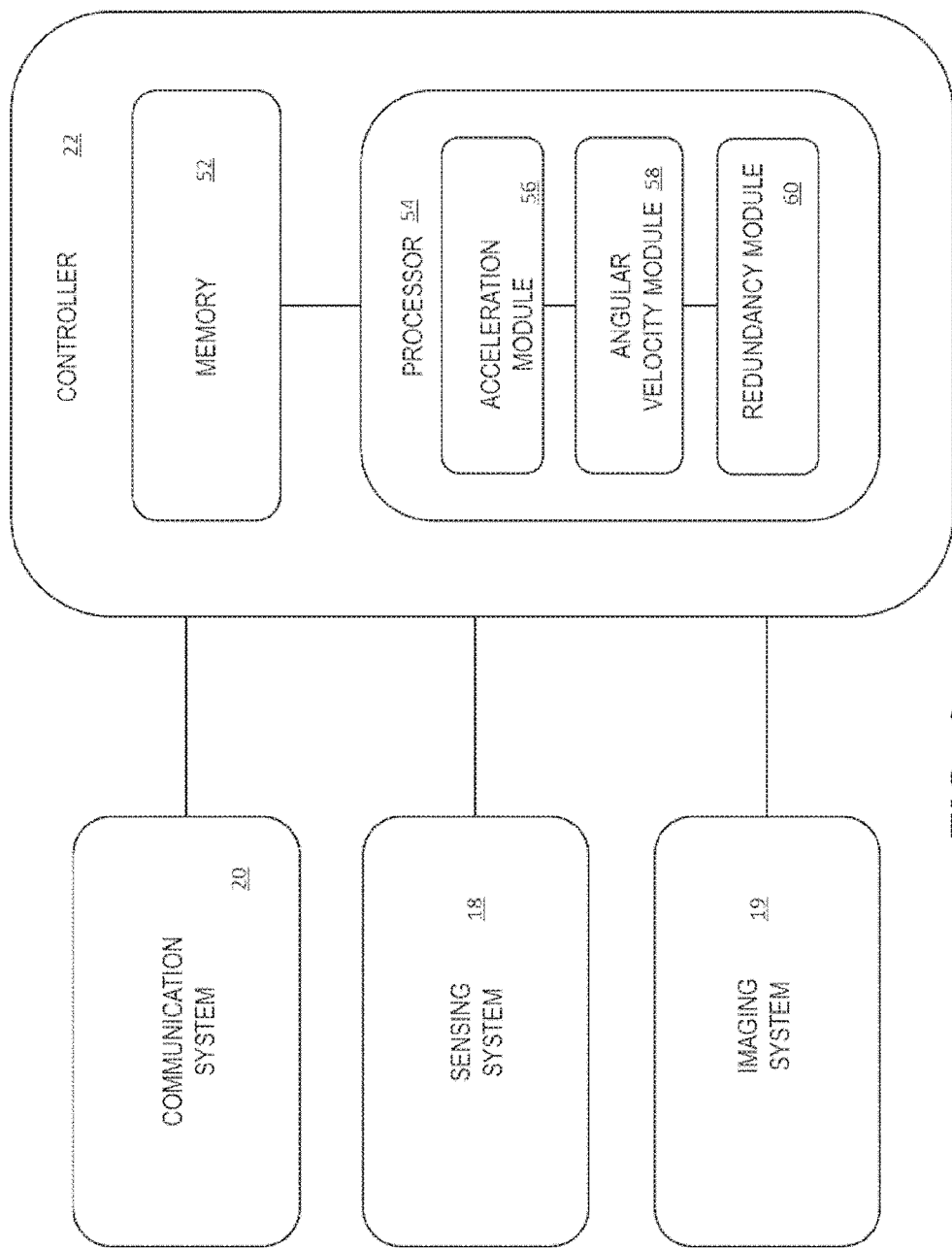
FIG. 3 is a block diagram of an exemplary controller that may be used in a movable object in accordance with embodiments of the present disclosure.

As shown in FIG. 3, controller 22 may include one or more components, for example, a memory 52 and at least one processor 54. Memory 52 may be or include at least one non-transitory co pr er readable medium and can include one or more memory units of non-transitory computer-readable medium. Non-transitory computer-readable medium of memory 52 may be or include any type of volatile or non-volatile memory device, for example including floppy disks, optical discs, DVD, CD-ROMs, microdrive, and magneto-optical disks, ROMs, RAMs, EPROMs, EEPROMs, DRAMs, VFRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Information and data from sensing system 18 may be communicated to and stored in non-transitory computer-readable medium of memory 52. The computer-readable medium associated with memory 52 may also be configured to store logic, code and/or program instructions executable by processor 54 to perform any suitable embodiment of the methods described herein. For example, the computer-readable medium associated with memory 52 may be configured to store computer-readable instructions that, when executed by processor 54, cause the processor to perform a method comprising one or more steps. The method performed by the processor based on the instructions stored in the non-transitory computer readable medium may involve processing inputs, such as inputs of data or information stored in the non-transitory computer-readable medium of memory 52, inputs received from terminal 32, inputs received from sensing system 18 (e.g., received directly from sensing system or retrieved from memory), and/or other inputs received via communication system 20. The non-transitory computer-readable medium may be configured to store sensing data from the sensing module to be processed by the processing unit. In some embodiments, the non-transitory computer-readable medium can be used to store the processing results produced by the processing unit.

The sensory device 19 in FIG. 1 may be embodied by the imaging system 19 in the exemplary embodiment of FIG. 3. In this disclosed embodiment, imaging system 19 may include imaging devices configured to gather data that may be used to generate images for surveying, tracking, and capturing images or video of targets (e.g., objects, landscapes, subjects of photo or video shoots, etc.). For example, imaging devices may include photographic cameras, video cameras, infrared imaging devices, ultraviolet imaging devices, x-ray devices, ultrasonic imaging devices, radar devices, etc. In this exemplary embodiment, the imaging device may be configured to generate optical data of the target for identifying and tracking the target. For example, the imaging device may be an optical device, such as a camera or video camera. The imaging device may be configured to generate imaging data indicative of one or more features of the target. The imaging system 19 may further be configured to communicate data (e.g., image frames) and information with controller 22 via a wired or wireless connection (e.g., RFID, Bluetooth, Wi-Fi, radio, cellular, etc.). Data and information generated by imaging system 19 and communicated to controller 22 may be used by controller 22 for further processing.

Processor 54 may include one or more processors and may embody a programmable processor, e.g., a central processing unit (CPU). Processor 54 may be operatively coupled to memory 52 or another memory device configured to store programs or instructions executable by processor 54 for performing one or more method steps. It is noted that method steps described herein may be stored in memory 52 and configured to be carried out by processor 54 to cause the method steps to be carried out by the processor 54.

In some embodiments, processor 54 may include and/or alternatively be operatively coupled to one or more control modules, such as an acceleration module 56, an angular velocity module 58, and a redundancy module 60, which will be explained in greater detail below. Acceleration module 56, angular velocity module 58, and redundancy module 60 may be implemented in software for execution on processor 54, or may be implemented in hardware and/or software components separate from processor 54 (not shown in the figure).

Acceleration module 56 may be configured to communicate with the sensing system 18 and determine acceleration information of the movable object 10 or components of movable object 10 to manipulate the movable object 10 or the components of movable object 10. Acceleration module 56 may also communicate with carrier sensors 30 to determine the status of carrier 16 and/or payload 14, and provide the information to other components of controller 22 to control or adjust carrier 16 and/or payload 14. Angular velocity module 58 may be configured to communicate with sensing system 18 and/or carrier sensors 30 and determine angular velocity information of the movable object 10 or components of the movable object 10 (such as carrier 16) to manipulate the movable object 10 or the components of the movable object 10.

Consistent with the disclosed embodiments, sensing system 18 or carrier sensors 30, as part of a navigation device or system, may comprise one or more multi-axis sensors to measure the acceleration or angular velocity of the system (e.g., movable object 10 or carrier 16) in which the device is mounted, where the one or more multi-axis sensors are positioned with respect to movable object 10 or with respect to each other to improve measurement range, measurement precision, and fault tolerance, as well as reduce the need for vibration reduction (e.g., damping).Each multi-axis sensor may comprise a three-axis acceleration sensor, a two-axis acceleration sensor, a three-axis angular velocity sensor (e.g., gyroscope), a two-axis angular velocity sensor, a six-axis sensor including a three-axis acceleration sensor and a three-axis angular velocity sensor (e.g., gyroscope), or a compass. The multi-axis sensors may be MEMS sensors.

In one aspect, a navigation device may comprise a multi-axis sensor, for example, a three-axis accelerometer, mounted on a carrier (e.g., on a physical structure of the movable object 10 or on the carrier 16 of the movable object), where the positioning of the sensor with respect to the carrier satisfies certain requirements for improving measurement qualities such as measurement range or fault tolerance, as explained in detail below. Accelerations are sensed or measured along the orthogonal axes of the accelerometer, and the acceleration module 56 may be configured to calculate actual (e.g., instantaneous) acceleration in the direction of each axis of the coordinate system of the carrier by first obtaining acceleration measurements in the sensor's coordinate system and converting those measured accelerations into the movable object's or carrier's coordinate system through a matrix multiplication or transformation.

During flight, the vertical vibration accelerations in the carrier's (or UAV's) coordinate system is usually much larger than accelerations in the other two directions of the carrier's coordinate system. The positioning of the sensor consistent with the present disclosure may provide for acceleration measurements with improved measurement ranges and reduced chances of out-of-range or output saturation errors, particularly in the vertical direction.

Figure 4A:
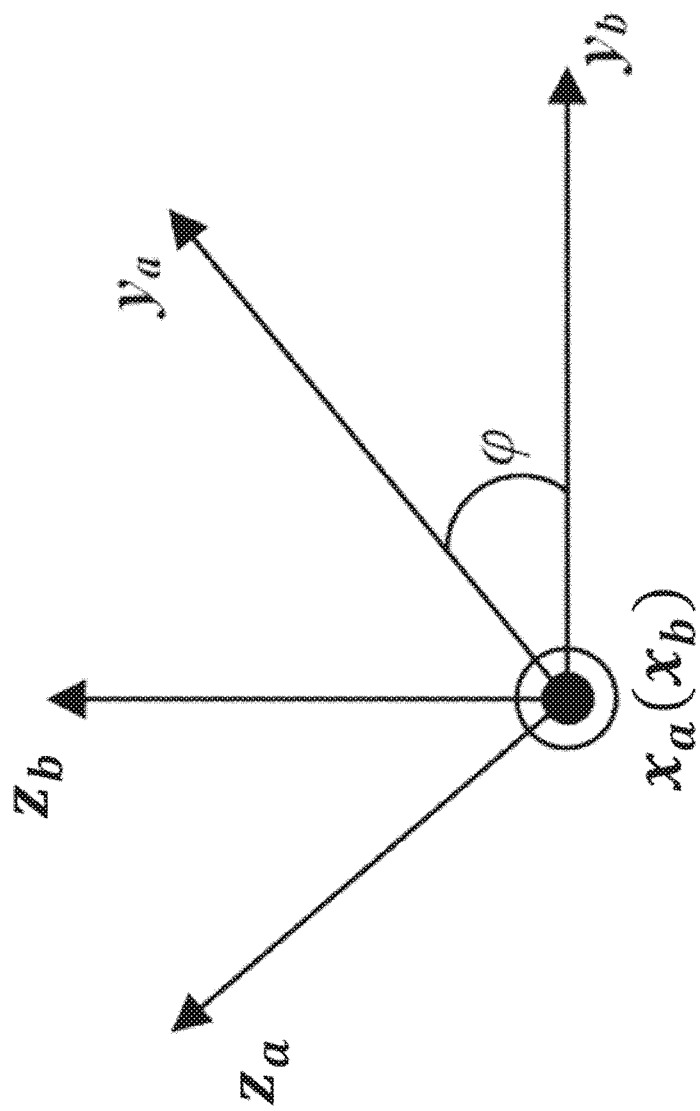
FIGS. 4A, 4B, and 4C are diagrams showing exemplary orientations of a sensor with respect to a coordinate system of a carrier in accordance with embodiments of the present disclosure.

In the exemplary embodiment of FIG. 4A, a multi-axis acceleration sensor may be mounted on a movable object, such as a UAV, or a carrier on the movable object, such that the relationship between the coordinate system of the sensor and the coordinate system of the movable object or the carrier satisfies the relevant requirements. For purposes of explanation, each of the disclosed embodiments refers to a coordinate system of the UAV, but it is contemplated that the disclosed embodiments alternatively could reference the coordinate system of the carrier. In addition, discussions below use the Cartesian coordinate systems, but the same principles apply to devices and systems that use the north-east-down (NED) coordinate system or any other coordinate system. FIG. 4A illustrates an example where the sensor is positioned such that the $x_a$ axis of the sensor's coordinate system aligns with the $x_b$ axis of the UAV's coordinate system, but the plane $y_a z_a$ of the sensor's coordinate system is at an angle $\varphi$ relative to the $y_b z_b$ plane of the UAV's coordinate system. The accelerations measured by the sensor in its own coordinate system correspond to accelerations in the UAV's coordinate system according to the following formula (I):

$$\begin{pmatrix} f_{xa} \\ f_{ya} \\ f_{za} \end{pmatrix} = \begin{bmatrix} 1 & 0 & 0 \\ 0 & \cos\varphi & \sin\varphi \\ 0 & -\sin\varphi & \cos\varphi \end{bmatrix} \begin{pmatrix} f_{xb} \\ f_{yb} \\ f_{zb} \end{pmatrix}, \qquad (1)$$

where $f_{xa}$, $f_{ya}$, $f_{za}$ are accelerations on each sensing axis of the sensor, respectively, and $f_{xb}$, $f_{yb}$, $f_{zb}$ are accelerations on each coordinate axis of the coordinate system of the UAV, respectively. Based on formula (1), if the three-axis acceleration sensor in this exemplary embodiment has a sensing range of $a_{max}$ then the maximum acceleration in the vertical direction (i.e., $z_b$ direction) of the coordinate system of the UAV is $a_{max}(\sin\varphi + \cos\varphi)$. When $\varphi = 45°$, the maximum acceleration in the vertical $z_b$ direction of the coordinate system of the UAV would be $\sqrt{2}a_{max}$, thus, effectively increasing the sensing range of acceleration in the vertical $z_b$ direction in the UAV's coordinate system while using an acceleration sensor with a smaller sensing range of $a_{max}$.

Figure 4B:
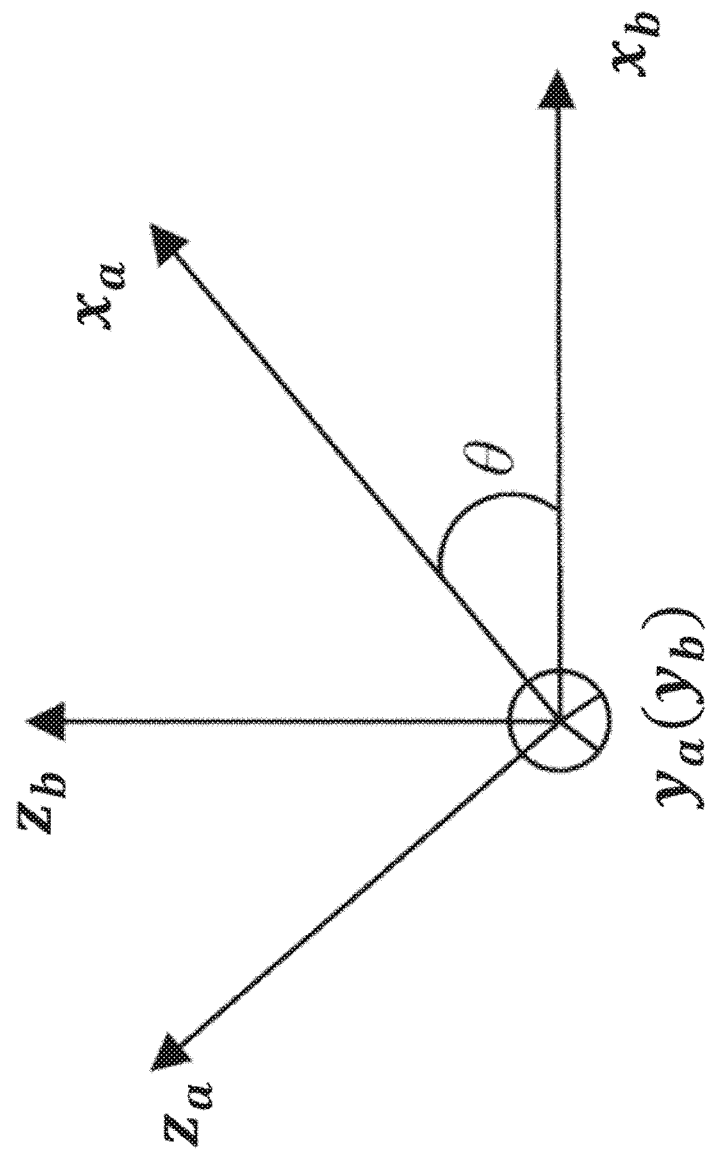

In some embodiments, the multi-axis acceleration sensor may be mounted in an inclined plane in the UAV's coordinate system as shown, for example, in FIG. 4B, where the sensor's $y_a$ axis is aligned with the UAV's $y_b$ axis, but the sensor's $x_a z_a$ plane is at an angle $\theta$ relative to the $x_b z_b$ plane of the UAV's coordinate system. The acceleration measured by the sensor corresponds to the acceleration in the UAV's coordinate system according to the following formula (2):

$$\begin{pmatrix} f_{xa} \\ f_{ya} \\ f_{za} \end{pmatrix} = \begin{bmatrix} \cos\theta & 0 & -\sin\theta \\ 0 & 1 & 0 \\ \sin\theta & 0 & \cos\theta \end{bmatrix} \begin{pmatrix} f_{xb} \\ f_{yb} \\ f_{zb} \end{pmatrix}, \qquad (2)$$

where $f_{xa}$, $f_{ya}$, $f_{za}$ are accelerations on each sensing axis of the sensor, respectively, and $f_{xb}$, $f_{yb}$, $f_{zb}$ are accelerations on each coordinate axis of the coordinate system of the UAV, respectively. Based on formula (2), if the three-axis acceleration sensor has a sensing range of $a_{max}$, then the maximum acceleration in the vertical direction (i.e., $z_b$ direction) of the coordinate system of the UAV is $\sqrt{2}a_{max}$ when $\theta = 45°$, thus, effectively increasing the sensing range of acceleration in the vertical $z_b$ direction of the coordinate system f the UAV by using an acceleration sensor with a smaller sensing range.

Figure 4C:
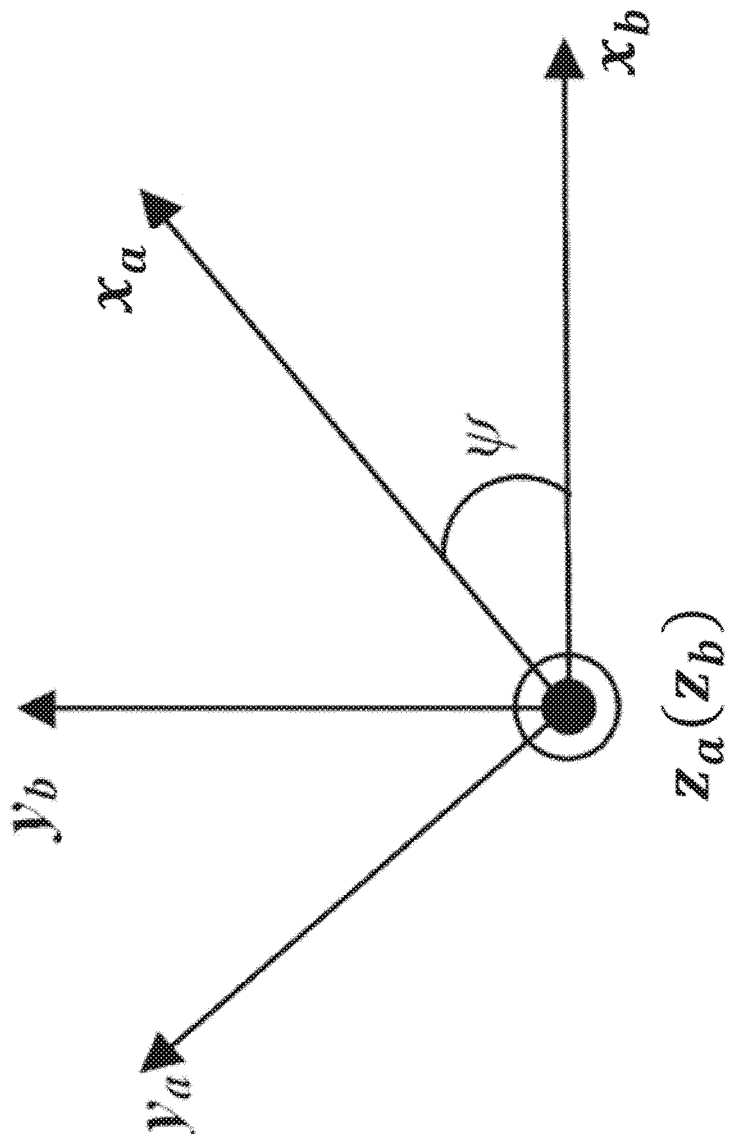

In yet other embodiments, the multi-axis acceleration sensor may be mounted in an inclined plane in the coordinate system of a UAV as shown in FIG. 4C, where the sensor's $z_a$ axis is aligned with the UAV's $z_b$ axis, but the sensor's $x_a y_a$ plane is at an angle $\psi$ relative to the $x_b y_b$ plane of the UAV's coordinate system. The acceleration measured by the sensor corresponds to the acceleration in the coordinate system of the UAV according to the following formula (3):

$$\begin{pmatrix} f_{xa} \\ f_{ya} \\ f_{za} \end{pmatrix} = \begin{bmatrix} \cos\psi & \sin\psi & 0 \\ -\sin\psi & \cos\psi & 0 \\ 0 & 0 & 1 \end{bmatrix} \begin{pmatrix} f_{xb} \\ f_{yb} \\ f_{zb} \end{pmatrix}, \qquad (3)$$

where $f_{xa}$, $f_{ya}$, $f_{za}$ are accelerations on each sensing axis of the sensor, respectively, and $f_{xb}$, $f_{yb}$, $f_{zb}$ are accelerations on each coordinate axis of the coordinate system of the UAV, respectively. Based on formula (3), if the three-axis acceleration sensor has a sensing range of $a_{max}$, then the maximum acceleration in the y, direction of the coordinate system of the UAV is $\sqrt{2}a_{max}$ when $\psi = 45°$, thus, effectively increasing the sensing range of acceleration in the $y_b$ direction of the coordinate system of the UAV by using an acceleration sensor with a smaller sensing range.

Figure 5A:
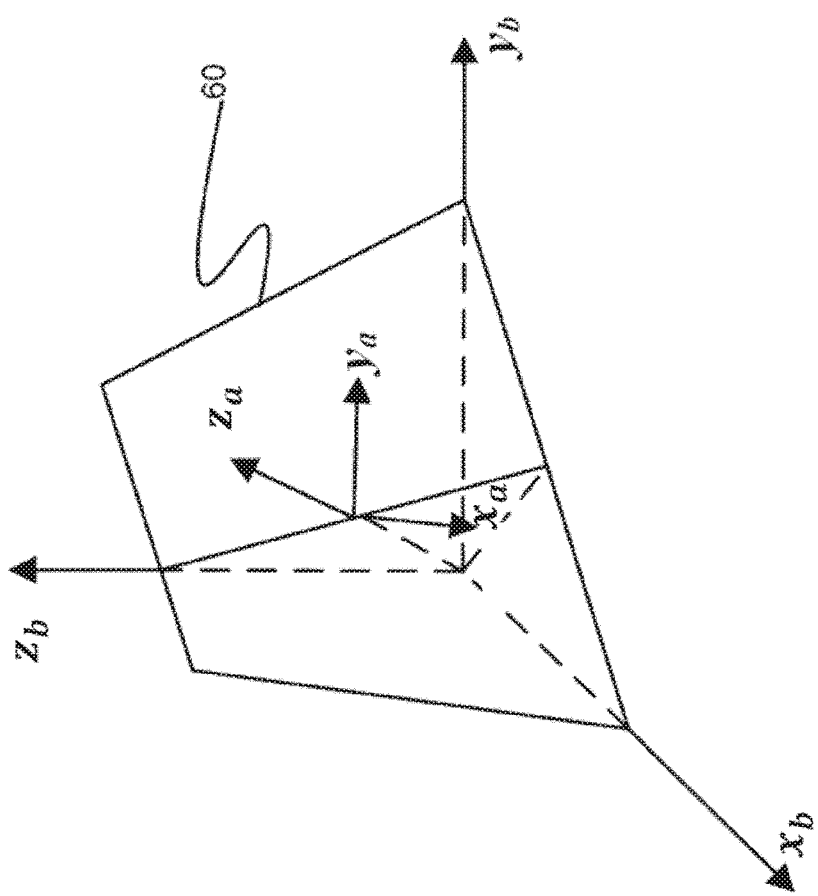
FIGS. 5A, 5B, 5C, and 5D are diagrams illustrating the coordinate system of an exemplary sensor with respect to the coordinate system of a carrier in accordance with embodiments of the present disclosure.
Figure 5B:
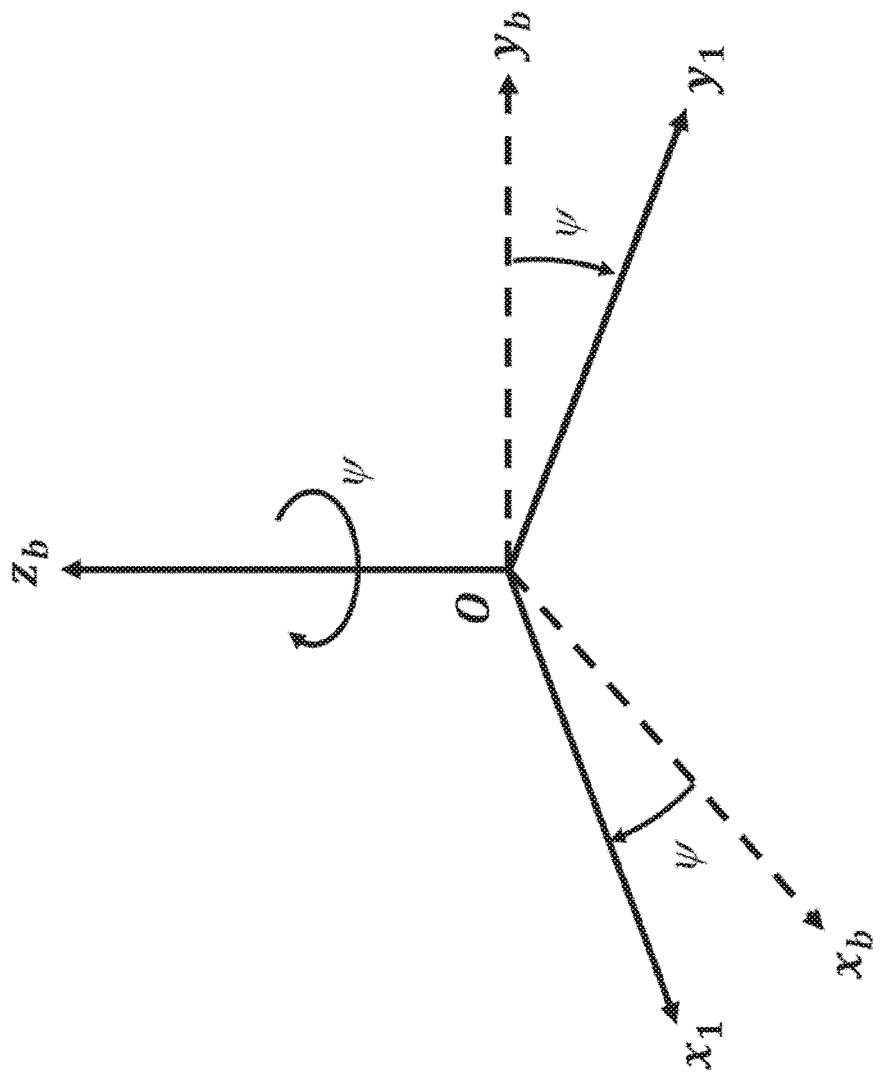
Figure 5C:
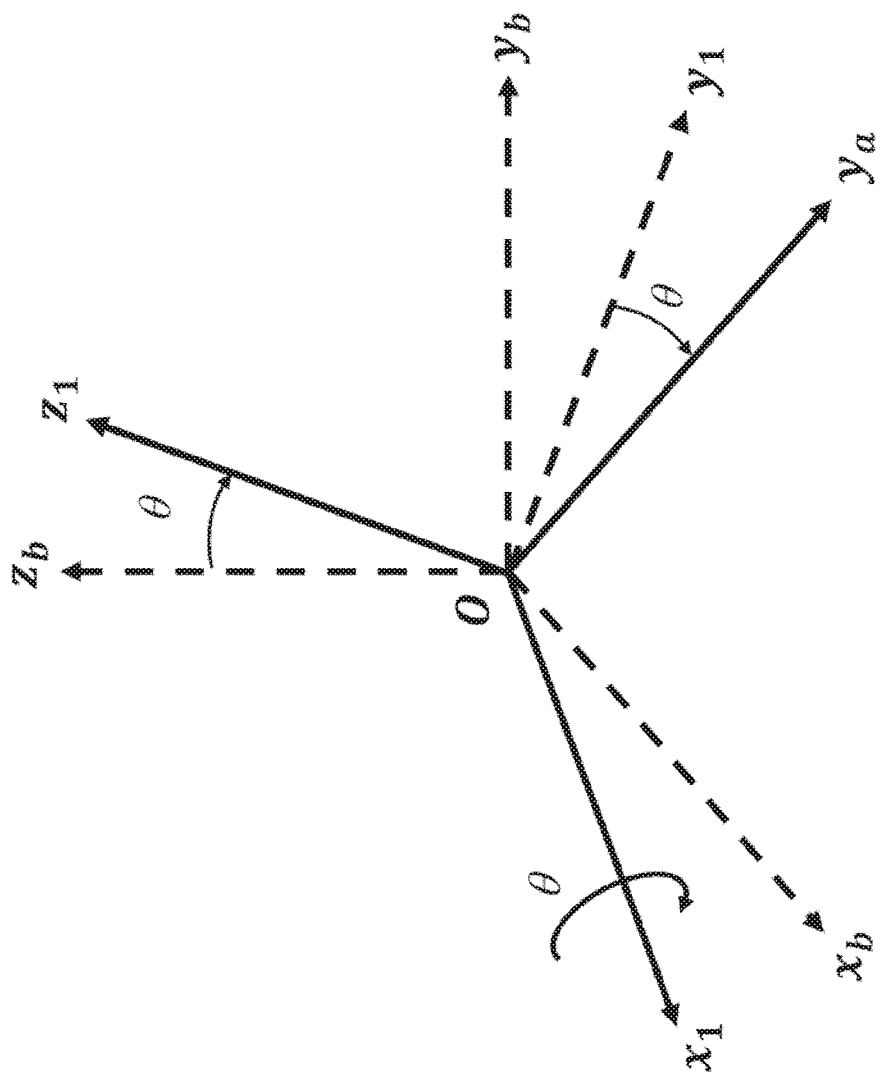
Figure 5D:
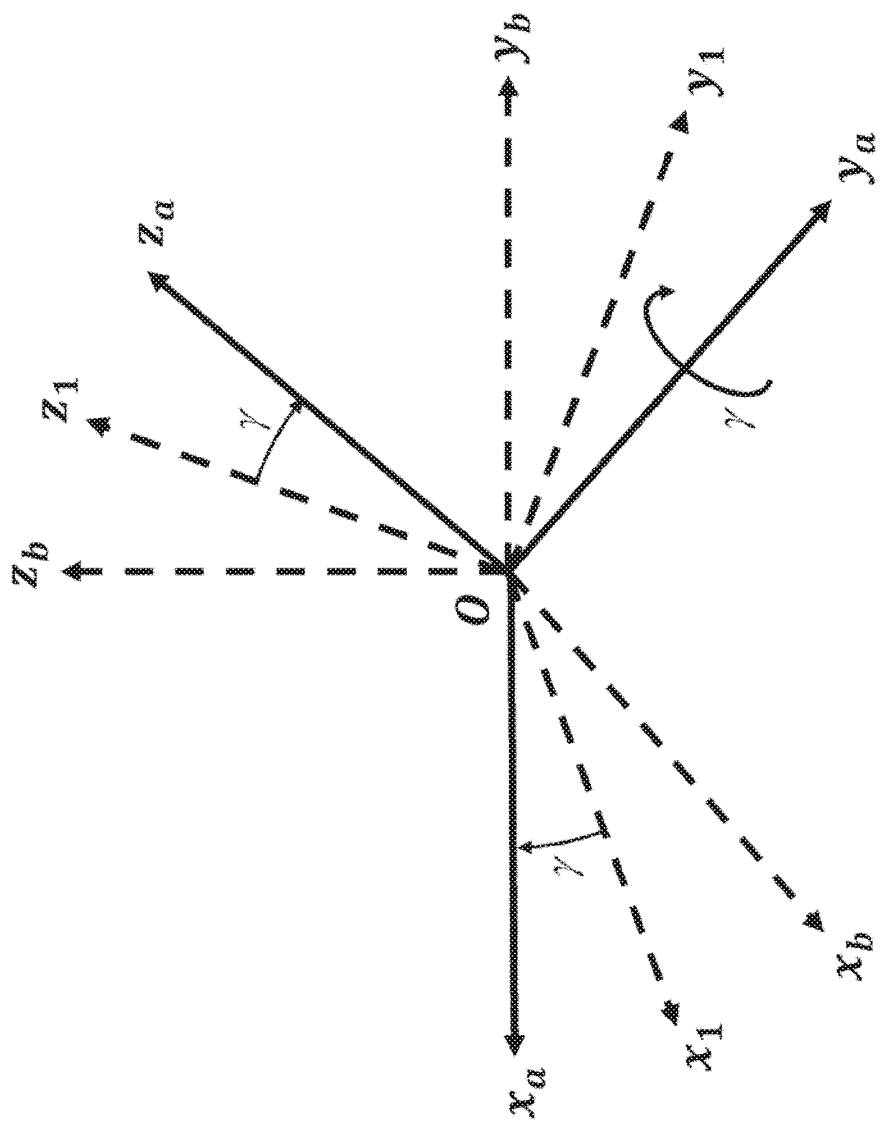

In some embodiments, a navigation device may include a sensor oriented in the UAV's coordinate system as shown, for example, in FIG. 5A. The three-axis integrated acceleration sensor or accelerometer 50 may be mounted on the UAV via a structure 52 fixedly connected to the UAV, e.g., at a location on the UAV's carrier 16. The orthogonal sensing axes of the sensor (e.g., $x_a y_a z_a$) can be obtained by rotating the coordinate axes in the UAV coordinate system (e.g., $x_b y_b z_b$) at most three times. For example, a rotation by an angle $\psi$ about the $z_b$ axis results in a coordinate system $O–x_1 y_1 z_b$ (O being the origin), as shown in FIG. 5B. A rotation by an angle θ about the $x_1$ axis results in a coordinate system $O-x_zy_az_1$, as shown in FIG. 5C. A rotation by an angle γ about the $y_a$ axis results in a coordinate system $O-x_ay_az_a$, as shown in FIG. 5D. The acceleration measured by the accelerometer with coordinate axes $x_ay_az_a$ corresponds to the acceleration in the coordinate system of the UAV according to the following formula (4):

$$\begin{pmatrix} f_{xa} \\ f_{ya} \\ f_{za} \end{pmatrix} = \begin{bmatrix} \cos\gamma & 0 & -\sin\gamma \\ 0 & 1 & 0 \\ \sin\gamma & 0 & \cos\gamma \end{bmatrix} \begin{bmatrix} 1 & 0 & 0 \\ 0 & \cos\theta & \sin\theta \\ 0 & -\sin\theta & \cos\theta \end{bmatrix} \begin{bmatrix} \cos\psi & \sin\psi & 0 \\ -\sin\psi & \cos\psi & 0 \\ 0 & 0 & 1 \end{bmatrix} \begin{pmatrix} f_{xb} \\ f_{yb} \\ f_{zb} \end{pmatrix}. \quad (4)$$

Figure 6A:
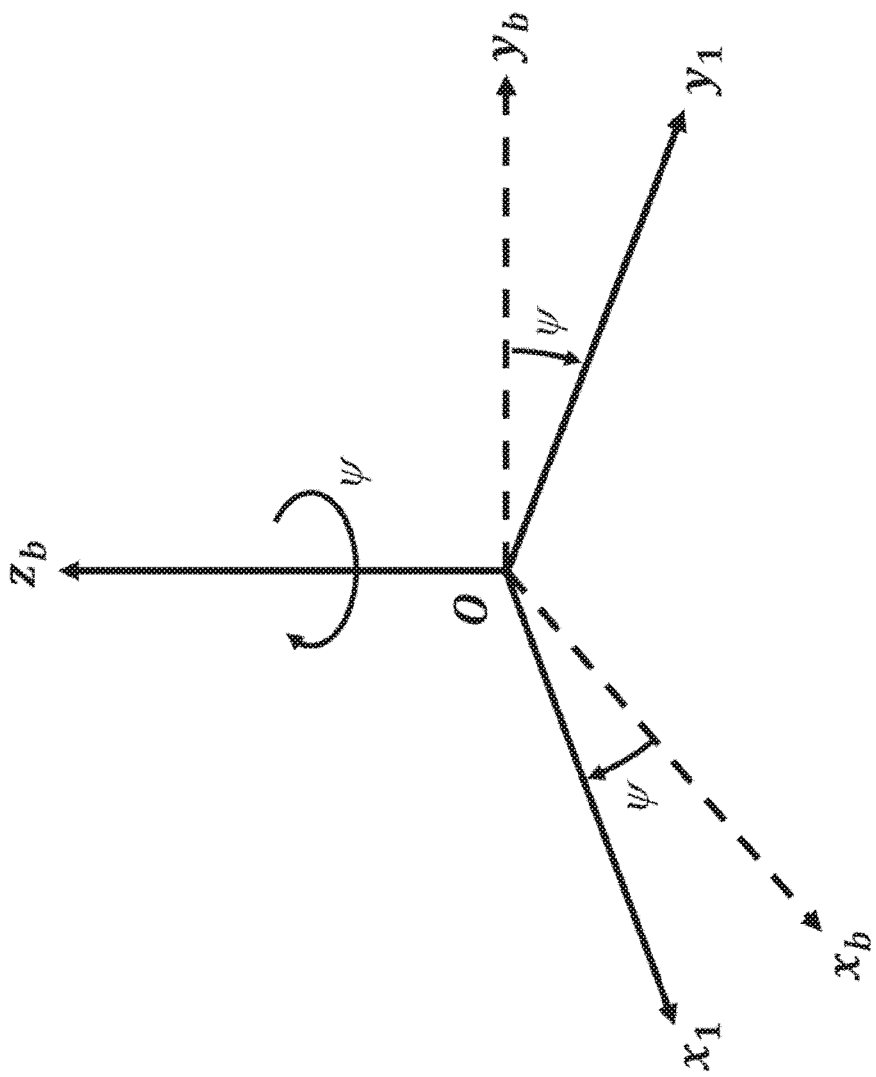
FIGS. 6A, 6B, and 6C are diagrams illustrating the coordinate system of another exemplary sensor with respect to the coordinate system of a carrier in accordance with embodiments the present disclosure.
Figure 6B:
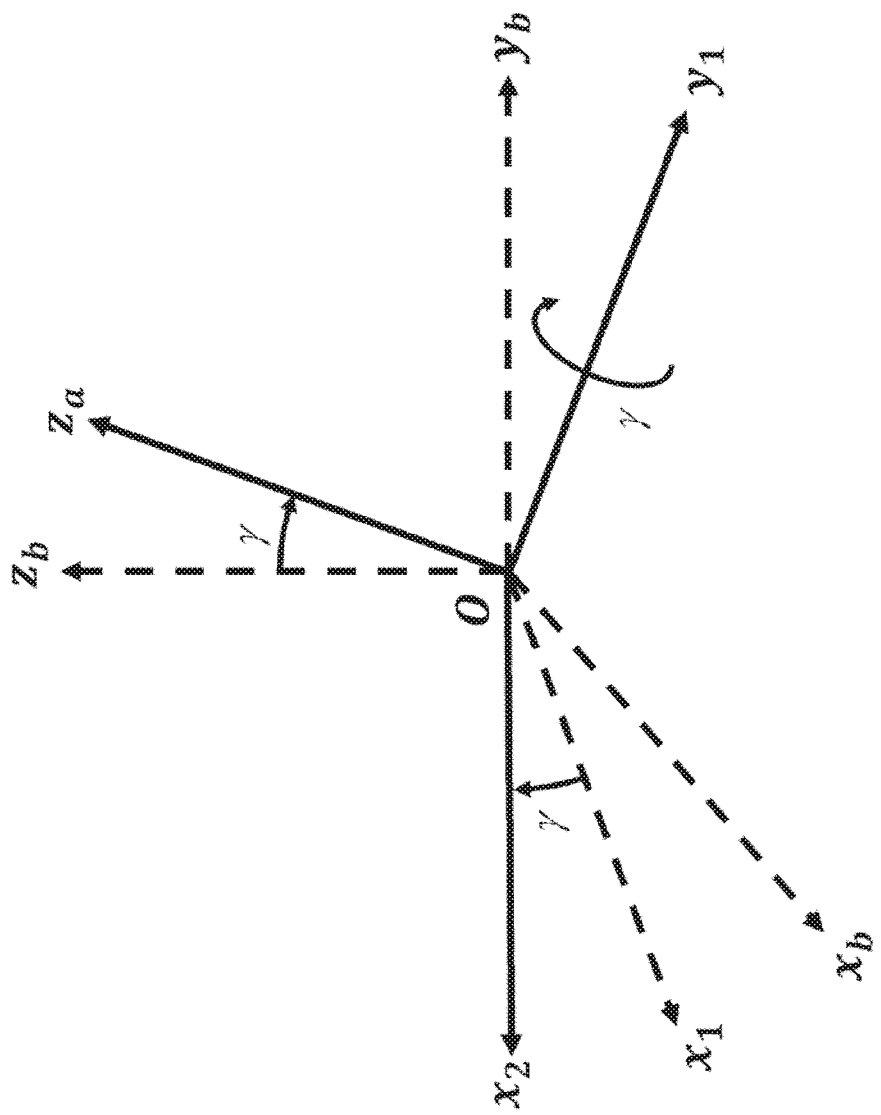
Figure 6C:
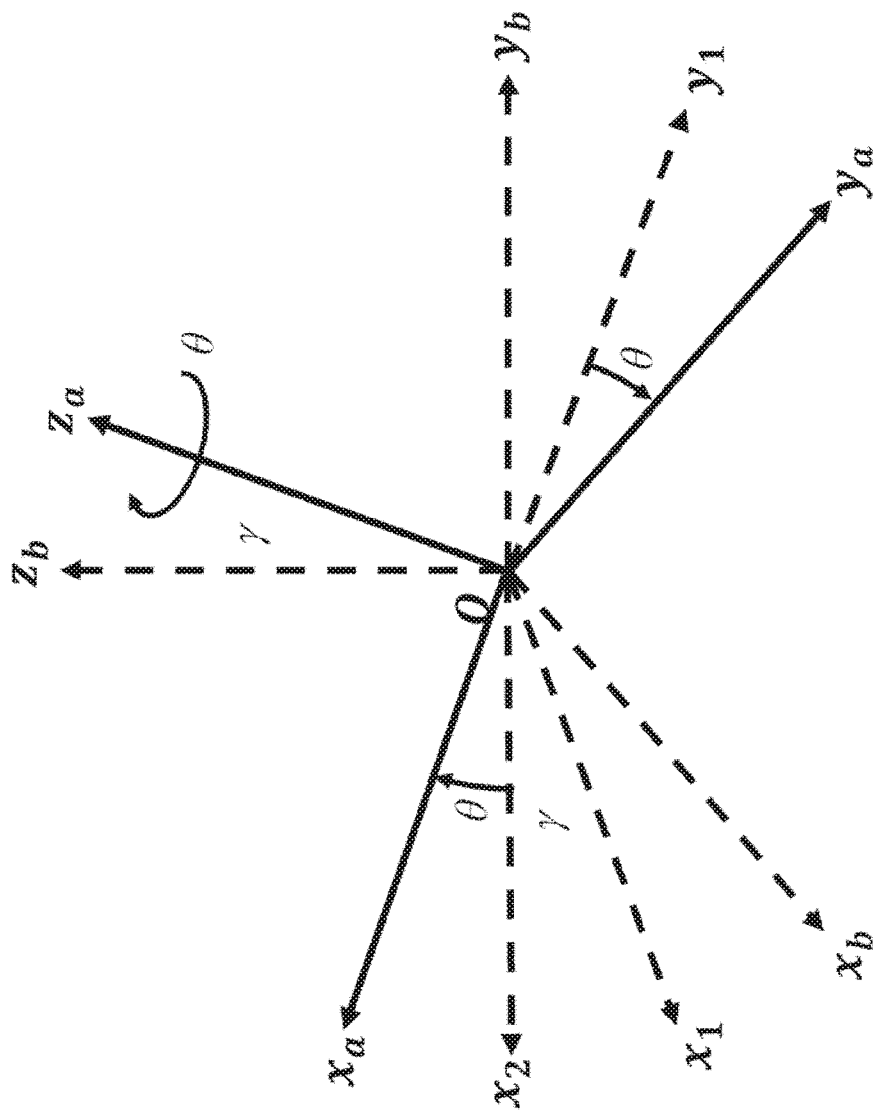

In some embodiments, installation of the sensor on the UAV may be based on a specific optimization indicator, for example, to increase the sensing range and/or avoid sensor saturation due to vibration accelerations in the vertical direction z of the UAV's coordinate system. For example, a sensor may be mounted such that its sensing coordinate system $(O-x_ay_az_a)$ can be obtained by rotating the UAV's coordinate system $(O-x_by_bz_b)$ by an angle ψ about $z_b$ to $O-x_1y_1z_b$ (FIG. 6A), rotating by an angle γ about $y_1$ to $O-x_2y_1z_a$ (FIG. 6B), and rotating by an angle θ about $z_a$ axis to $O-x_ay_az_a$ (FIG. 6C). The acceleration measured by the sensor corresponds to the acceleration in the coordinate system of the UAV by the following formula (5):

$$\begin{pmatrix} f_{xa} \\ f_{ya} \\ f_{za} \end{pmatrix} = \begin{bmatrix} \cos\theta & \sin\theta & 0 \\ -\sin\theta & \cos\theta & 0 \\ 0 & 0 & 1 \end{bmatrix} \begin{bmatrix} \cos\gamma & 0 & -\sin\gamma \\ 0 & 1 & 0 \\ \sin\gamma & 0 & \cos\gamma \end{bmatrix} \begin{bmatrix} \cos\psi & \sin\psi & 0 \\ -\sin\psi & \cos\psi & 0 \\ 0 & 0 & 1 \end{bmatrix} \begin{pmatrix} f_{xb} \\ f_{yb} \\ f_{zb} \end{pmatrix}. \quad (5)$$

Accordingly, the acceleration in the $z_b$ direction of the UAV's coordinate system may be decomposed into the three sensing axes in the sensor's coordinate system, effectively expanding the sensing range of acceleration in the $z_b$ direction. For example, when ψ=45° and γ=54.74°, an inclined plane on which the three-axis sensor is disposed forms an angle of 54.74° with respect to the xy plane, and correspondingly, the maximum sensing range of acceleration in the $z_b$ direction is $\sqrt{3}a_{max}$.

In some embodiments, various configurations for mounting a sensor, e.g., on the carrier 16 of the movable object 10, may be achieved by combining one or more of the exemplary configurations in FIGS. 4A-4C, 5A-5D, and 6A-6C.

To further improve reliability of the navigation device or system, redundancy may also be used at the inertial sensor level. Conventionally, primary and secondary MIMU sensors are mounted and oriented on the UAV. The secondary MIMU is only used for navigation if the primary MIMU fails. This conventional approach, however, does not make good use of redundant information from the MIMU sensors, and exhibits poor fault tolerance and detection.

Further to some disclosed embodiments, the disclosed systems and methods provide a navigation device, in either sensing system 18 or carrier sensors 30 or both, with two or more sensors that are integrated and mounted on a movable object, such as a UAV, and utilize the redundancy between the sensors' measurements to improve the reliability of the navigation device. In these exemplary embodiments, the redundancy module 58 may be configured to communicate with the sensing system 18 and/or carrier sensors 30 and use the redundant information from the multiple sensors to provide better control of the movable object 10 or the components of the movable object 10. The redundancy module 58 may be part of the navigation system as well.

Figure 7:
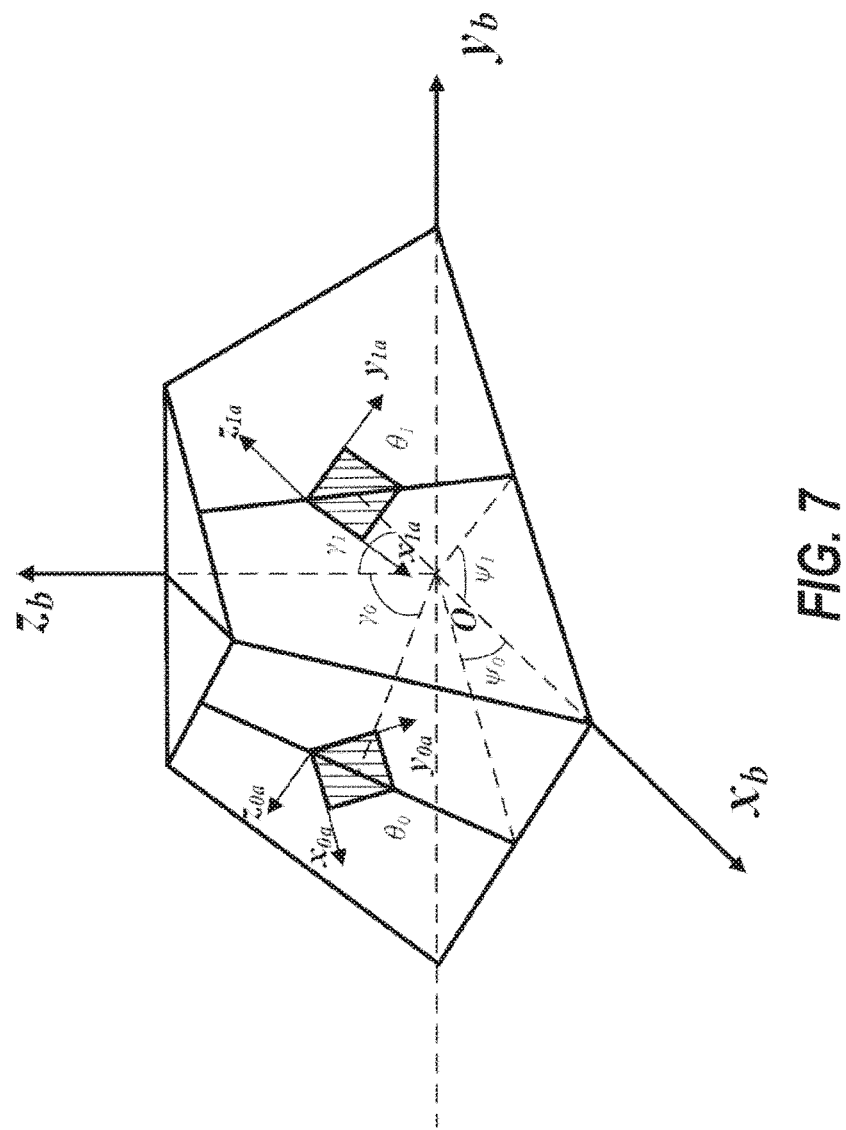
FIG. 7 illustrates an exemplary configuration of two sensors with respect to the coordinate system of a carrier and with respect to each other in accordance with embodiments of the present disclosure.

FIG. 7 shows an example where a navigation device consistent with embodiments of the present disclosure, such as sensing system 18 or carrier sensors 30, includes two three-axis accelerometers. UAV 10's own coordinate system is defined with axes $x_b$, $y_b$, $z_b$. Each accelerometer has its own coordinate system. The first accelerometer senses acceleration along three axes $x_{0a}$, $y_{0a}$, $z_{0a}$; and the second accelerometer senses acceleration along three axes $x_{1a}$, $y_{1a}$, $z_{1a}$. In the example shown in FIG. 7, the $x_{0a}$, $y_{0a}$, $z_{0a}$ axes are obtained by rotating UAV 10's coordinate system first by angle $\psi_0$ around the z axis (initially $z_b$), then by angle $\gamma_0$ around the y axis (y axis at this moment is already offset from $y_b$ by angle $\psi_0$), and finally by angle $\theta_0$ around the x axis (x axis at this moment has already gone through two rotations from the initial $x_b$ axis). Likewise, the $x_{1a}$, $y_{1a}$, $z_{1a}$ axes are obtained by rotating UAV 10's coordinate system first by angle $\psi_1$ around the z axis (initially $z_b$), then by angle $\gamma_1$ around the y axis (y axis at this moment is already offset from $y_b$ by angle $\psi_1$), and finally by angle $\theta_1$ around the x axis (x axis at this moment has already gone through two rotations from the initial $x_b$ axis).

The acceleration measured by each accelerometer can be expressed both in the accelerometer's coordinate system, as $(f_{xa}, f_{ya}, f_{za})$, and in UAV 10's coordinate system, as $(f_{xb}, f_{yb}, f_{zb})$. The relationship between the two can be expressed as a matrix multiplication as follows:

$$\begin{pmatrix} f_{x0a} \\ f_{y0a} \\ f_{z0a} \end{pmatrix} = \begin{bmatrix} 1 & 0 & 0 \\ 0 & \cos\theta_0 & \sin\theta_0 \\ 0 & -\sin\theta_0 & \cos\theta_0 \end{bmatrix} \begin{bmatrix} \cos\gamma_0 & 0 & -\sin\gamma_0 \\ 0 & 1 & 0 \\ \sin\gamma_0 & 0 & \cos\gamma_0 \end{bmatrix}$$
$$\begin{bmatrix} \cos\psi_0 & \sin\psi_0 & 0 \\ -\sin\psi_0 & \cos\psi_0 & 0 \\ 0 & 0 & 1 \end{bmatrix} \begin{pmatrix} f_{xb} \\ f_{yb} \\ f_{zb} \end{pmatrix};$$

$$\begin{pmatrix} f_{x1a} \\ f_{y1a} \\ f_{z1a} \end{pmatrix} = \begin{bmatrix} 1 & 0 & 0 \\ 0 & \cos\theta_1 & \sin\theta_1 \\ 0 & -\sin\theta_1 & \cos\theta_1 \end{bmatrix} \begin{bmatrix} \cos\gamma_1 & 0 & -\sin\gamma_1 \\ 0 & 1 & 0 \\ \sin\gamma_1 & 0 & \cos\gamma_1 \end{bmatrix}$$
$$\begin{bmatrix} \cos\psi_1 & \sin\psi_1 & 0 \\ -\sin\psi_1 & \cos\psi_1 & 0 \\ 0 & 0 & 1 \end{bmatrix} \begin{pmatrix} f_{xb} \\ f_{yb} \\ f_{zb} \end{pmatrix}.$$

If we use positioning matrices $H_0$ and $H_1$ to represent the multiplication of the three 3×3 matrices:

$$H_0 = \begin{bmatrix} 1 & 0 & 0 \\ 0 & \cos\theta_0 & \sin\theta_0 \\ 0 & -\sin\theta_0 & \cos\theta_0 \end{bmatrix} \begin{bmatrix} \cos\gamma_0 & 0 & -\sin\gamma_0 \\ 0 & 1 & 0 \\ \sin\gamma_0 & 0 & \cos\gamma_0 \end{bmatrix} \begin{bmatrix} \cos\psi_0 & \sin\psi_0 & 0 \\ -\sin\psi_0 & \cos\psi_0 & 0 \\ 0 & 0 & 1 \end{bmatrix},$$

and $$H_1 = \begin{bmatrix} 1 & 0 & 0 \\ 0 & \cos\theta_1 & \sin\theta_1 \\ 0 & -\sin\theta_1 & \cos\theta_1 \end{bmatrix} \begin{bmatrix} \cos\gamma_1 & 0 & -\sin\gamma_1 \\ 0 & 1 & 0 \\ \sin\gamma_1 & 0 & \cos\gamma_1 \end{bmatrix} \begin{bmatrix} \cos\psi_1 & \sin\psi_1 & 0 \\ -\sin\psi_1 & \cos\psi_1 & 0 \\ 0 & 0 & 1 \end{bmatrix},$$

then $\begin{pmatrix} f_{x0a} \\ f_{y0a} \\ f_{z0a} \end{pmatrix} = H_0 \begin{pmatrix} f_{xa} \\ f_{ya} \\ f_{za} \end{pmatrix}$, and $\begin{pmatrix} f_{x1a} \\ f_{y1a} \\ f_{z1a} \end{pmatrix} = H_1 \begin{pmatrix} f_{xa} \\ f_{ya} \\ f_{za} \end{pmatrix}$, where $H_0$ and $H_1$ are both 3×3 matrices, and they represent the 3-D orientation of the two accelerometers. The two accelerometers can be combined into a representation by a 6×3 overall positioning matrix H:

$$H = \begin{bmatrix} H_0 \\ H_1 \end{bmatrix},$$

where $H_0=[h_1\ h_2\ h_3]^T$, and $H_1=[h_4\ h_5\ h_6]^T$, superscript operator T indicating the transpose of a matrix.

Consistent with embodiments of the present disclosure, the overall positioning matrix H may be determined to provide improvement of one or more aspects of the sensor, such as sensing range in certain direction(s), precision of measurement, fault tolerance, etc. Accordingly, one or more of the following requirements may be used to find the proper positioning matrix H.

a) Inherent restraints of each sensor, such as orthogonality. When accelerometers designed with orthogonal coordinate axes are used, the two accelerometers should each have three orthogonal axes, such that:

For the first accelerometer, $h_i^T h_j = 0$, where i, j=2, 3 and i≠j; and

For the first accelerometer, $h_m^T h_n = 0$, where m, n=5, 6 and m≠n.

Note that sensors with alternative, non-orthogonal coordinate axes may be used, in which case orthogonality is not a requirement, and the inherent constraints would reflect the non-orthogonal structure of the sensor.

b) Optimized measurement range in certain direction. For example, vibration acceleration in the vertical direction in a UAV's coordinate system is often the largest. To maximize the sensing range and avoid overshoot in the vertical direction, the positioning matrix H may be optimized through the following:

$$\min_{H}\ \max_{i=1,2,\ldots,6} |h_i^T z|,$$

where $z=[0\ 0\ 1]^T$ selects the direction in which the sensing range is to be improved.

c) Optimized navigation. When two or more sensors are integrated together to provide redundant information, navigation is optimized when $$H^T H = \frac{n}{3} I_3,$$

where $I_3$ is a 3×3 identity matrix, and n=6 for two 3-axis accelerometers. Shim and Yang, in their paper titled *Optimal Configuration of Redundant Inertial Sensors for Navigation and FDI Performance*, Sensors 2010, 10, 6497-6512, provided proof of the optimization of navigation under this condition. The entirety of the paper is incorporated by reference.

d) Optimized utilization of information redundancy and improved fault tolerance level. When two or more sensors are not positioned orthogonally, their measurements would include redundant information. Fault tolerance is maximized when:

$$\min_{H}\ \max_{i,j=1,2,\ldots,6(i<j)} |h_i^T h_j|.$$

e) If requirements a)-d) do not result in a definite positioning matrix H, additional requirements may be added to narrow the possibilities. For example, if optimization of measurement range in the vertical direction (requirement b)) does not result in a certain positioning matrix, a further requirement may be imposed. For example, acceleration in the forward-backward direction of a UAV may have a wide range, even though not as much as in the vertical direction. Thus, H may be determined to maximize the range in the forward-backward direction, i.e., along the axis:

$$\min_{H \in E_{1-4}}\ \max_{i=1,2,\ldots,6} |h_i^T x|$$

where $x=[1\ 0\ 0]^T$, and $H \in E_{1-4}$ assumes the requirements a)-d) are all met ($E_{1-4}$ referring to the four requirements).

Requirements a)-e) are only exemplary, non-limiting, and not all necessary. In some embodiments, only some of the requirements, for example, b)-e), are imposed. In other embodiments, all requirements a)-e) are imposed. In still other embodiments, additional requirements may be imposed and/or combined with some or all of requirements a)-e).

Once the requirements are defined, various algorithms, such as the genetic algorithm, simulated annealing algorithm, particle swarm, optimization algorithm, etc., be employed to find the optimal positioning matrix H. And the positioning matrix H may then be used for positioning the sensors.

Figure 8A:
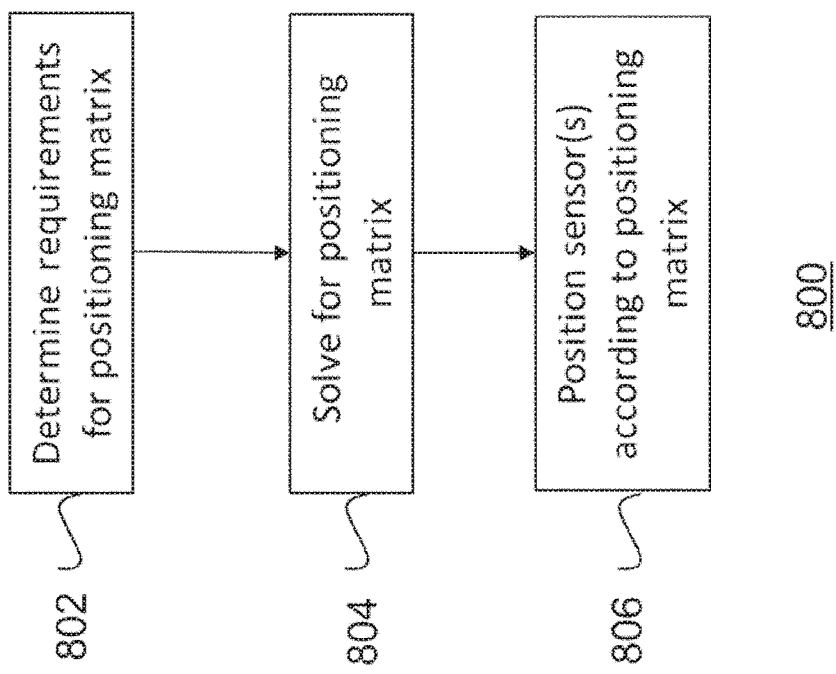
FIG. 8A shows an exemplary method that may be used to mount sensor(s) consistent with embodiments disclosed herein.

FIG. 8A shows an exemplary method 800 that may be used to mount sensor(s) consistent with embodiments disclosed herein. In step 802, requirements for the sensor(s) are determined based on needs for the application. For example, some or all of requirements a)-e) above, such as orthogonality, optimized measurement range in certain direction(s), improved navigation, better utilization of information redundancy, etc., may be selected. Depending on the application, additional requirements may be imposed as well. In step 804, the positioning matrix H is determined based on the requirements identified in step 802. In step 806, the positioning matrix H is used for mounting the sensor(s).

Figure 8B:
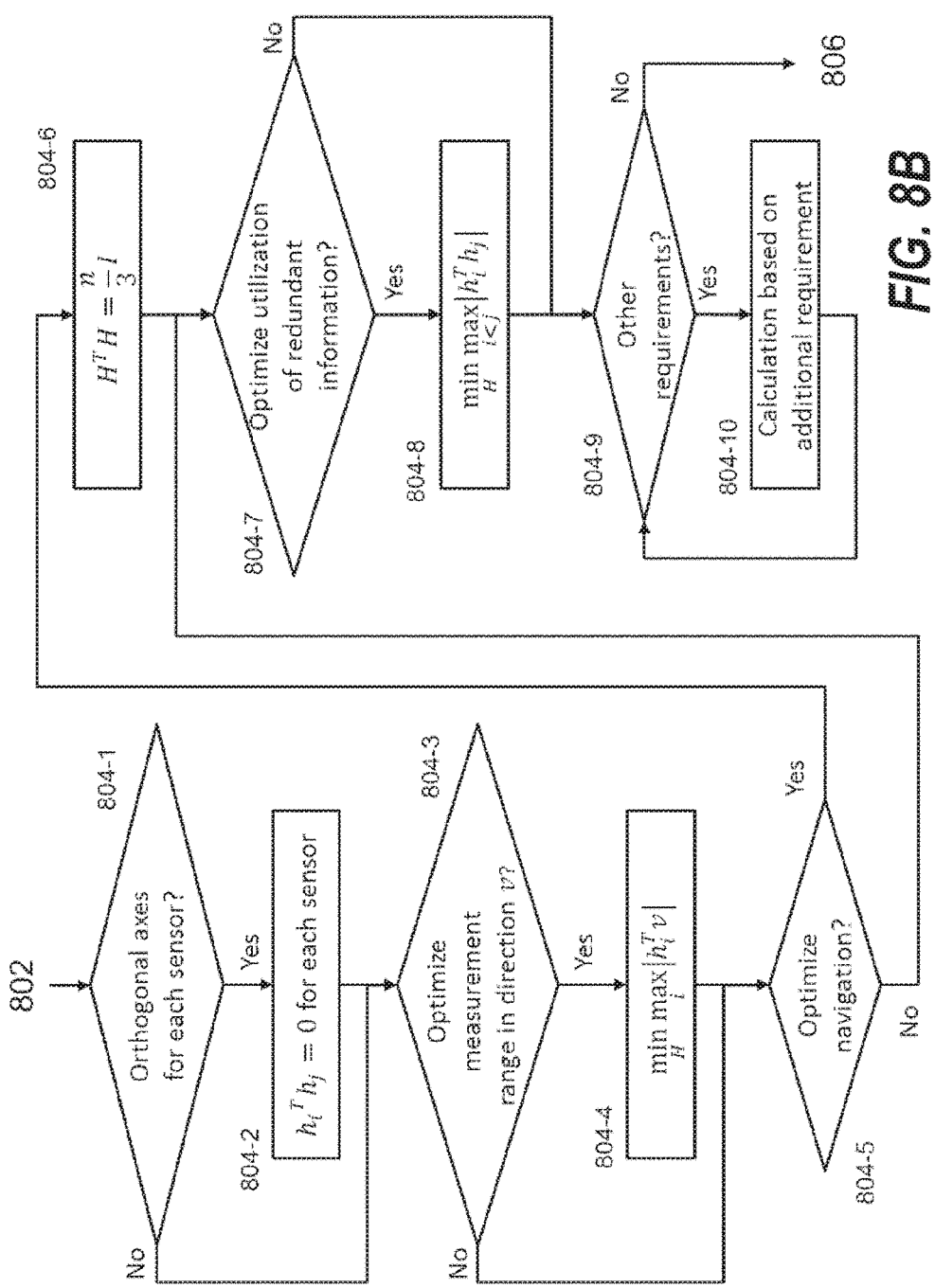
FIG. 8B illustrates the process for determining a positioning matrix for mounting sensor(s) consistent with embodiments disclosed herein.

FIG. 8B illustrates the process for determining the positioning matrix H (step 804). For example, if orthogonality is required (inquiry at step 804-1), the positioning matrix H must satisfy $h_i^T h_j = 0$ for each sensor (step 804-2). If measurement range needs to be optimized in the v direction (inquiry at step 804-3), where v may be any particular direction as needed (such as the z or x direction), the positioning matrix H must satisfy $$\min_{H}\ \max_{i=1,2,\ldots,6} |h_i^T v|$$

(step 804-4). To achieve better navigation (inquiry at step 804-5), the positioning matrix H must satisfy $$H^T H = \frac{n}{3} I,$$

where when I is the identity matrix (step 804-6). To make better use of redundant information across multiple sensors (inquiry at step 804-7), the positioning matrix must satisfy $$\min_{H}\ \max_{i<j} |h_i^T h_j|$$

(step 804-8). Then, if other requirements are imposed (inquiry at step 804-9), corresponding calculations can be performed (step 804-10) to determine the positioning matrix H.

It is to be noted that, the steps in FIG. 8B do not need to be performed in the particular manner as shown. Some may be skipped as appropriate for the particular application, and the order of calculation may be changed or adjusted as necessary.

In one aspect of the disclosed embodiments, the optimal positioning matrix H for a configuration with two 3-axis accelerometers is found to be:

$$H = \begin{bmatrix} -1/\sqrt{2} & -1/\sqrt{6} & \sqrt{3} \\ -1/\sqrt{2} & 1/\sqrt{6} & -\sqrt{3} \\ 0 & -2/\sqrt{6} & -\sqrt{3} \\ 1/\sqrt{2} & 1/\sqrt{6} & \sqrt{3} \\ 0 & 2/\sqrt{6} & -\sqrt{3} \\ -1/\sqrt{2} & 1/\sqrt{6} & 1/\sqrt{3} \end{bmatrix}.$$

This positioning matrix raises the sensing range in the vertical direction to $\sqrt{3}$ times of the sensing range of the accelerometer, and raises the sensing range in the x-axis direction to $\sqrt{2}$ times. In this configuration, the angle between any two axes of the six axes is no less than 48.1897°, and the projection of measurement along any axis onto any other axis is less than ⅔, thus providing the best fault tolerance. In addition, this configuration provides twice as precise measurements as an MIMU with a single sensor, hence better navigation.

Once one positioning matrix H is found, other related, equivalent, matrices can be easily obtained. For example, for either sensor, swapping two rows of its positioning matrix, e.g., $h_1$ and $h_2$ in $H_1$, and changing the direction of the third row, results in an equivalent matrix H' with the same properties or qualities as H:

$$H' = \begin{bmatrix} -1/\sqrt{2} & 1/\sqrt{6} & -1/\sqrt{3} \\ -1/\sqrt{2} & -1/\sqrt{6} & 1/\sqrt{3} \\ 0 & 2/\sqrt{6} & 1/\sqrt{3} \\ 1/\sqrt{2} & 1/\sqrt{6} & 1/\sqrt{3} \\ 0 & 2/\sqrt{6} & -1/\sqrt{3} \\ -1/\sqrt{2} & 1/\sqrt{6} & 1/\sqrt{3} \end{bmatrix}.$$

Alternatively, swapping the positioning matrices of any two sensors in the system matrix H results in another equivalent matrix H" with the same qualities or properties as H.

The various embodiments described above use accelerometers as an example. The same principles apply to other types of sensors, such as gyroscopic sensors that measure angular velocities, or when the sensor (sensing system 18 and/or carrier sensors 30) comprises both accelerometer(s) and gyroscope(s). The MEMS sensors may also comprise one or more compasses. Moreover, the embodiments discussed above use two accelerometers as an example. The same principles apply when a navigation device includes more than two sensors integrated together.

For example, a navigation device consistent with the present disclosure may comprise two 3-axis MEMS gyroscopes. In one aspect, one of the gyroscopes is positioned horizontally and aligned with the coordinate system of the UAV and the other gyroscope is obliquely positioned. Thus, the positioning matrix of the first gyroscope is a 3×3 identity matrix:

$$H_0 = \begin{bmatrix} 1 & 0 & 0 \\ 0 & 1 & 0 \\ 0 & 0 & 1 \end{bmatrix}.$$

The overall positioning matrix may be determined based on some of the requirements outlined above, in particular, optimized navigation and improved level of fault tolerance, and one exemplary matrix that satisfies those requirements may be:

$$H = \begin{bmatrix} 1 & 0 & 0 \\ 0 & 1 & 0 \\ 0 & 0 & 1 \\ 1/3 & 2/3 & -2/3 \\ 2/3 & 1/3 & 2/3 \\ 2/3 & -2/3 & -1/3 \end{bmatrix}.$$

Thus, the positioning matrix of the second gyroscope is $$H_1 = \begin{bmatrix} 1/3 & 2/3 & -2/3 \\ 2/3 & 1/3 & 2/3 \\ 2/3 & -2/3 & -1/3 \end{bmatrix}.$$

Equivalent matrices may be obtained using the same methods described above. Once the positioning matrices are determined, they may then be used for configuring the two MEMS gyroscopes.

Likewise, a navigation device consistent with the present disclosure may comprise multiple compasses. For example, in a navigation device with three 3-axis MEMS compasses, one compass may be positioned horizontally and aligned with the UAV, and the other two obliquely positioned. The positioning matrix of the first compass is the 3×3 identity matrix:

$$H_0 = \begin{bmatrix} 1 & 0 & 0 \\ 0 & 1 & 0 \\ 0 & 0 & 1 \end{bmatrix}.$$

With the requirements outlined above, an optimized system positioning matrix may be:

$$H = \begin{bmatrix} 1 & 0 & 0 \\ 0 & 1 & 0 \\ 0 & 0 & 1 \\ 0 & -\sqrt{2}/2 & -\sqrt{2}/2 \\ \sqrt{2}/2 & 1/2 & -1/2 \\ \sqrt{2}/2 & -1/2 & 1/2 \\ \sqrt{2}/2 & 1/2 & 1/2 \\ -\sqrt{2}/2 & 1/2 & 1/2 \\ 0 & -\sqrt{2}/2 & \sqrt{2}/2 \end{bmatrix},$$

or:

-continued $$H = \begin{bmatrix} 1 & 0 & 0 \\ 0 & 1 & 0 \\ 0 & 0 & 1 \\ 1/2 & \sqrt{2}/2 & -1/2 \\ -\sqrt{2}/2 & 0 & -\sqrt{2}/2 \\ -1/2 & \sqrt{2}/2 & 1/2 \\ 1/2 & -\sqrt{2}/2 & 1/2 \\ \sqrt{2}/2 & 0 & -\sqrt{2}/2 \\ 1/2 & \sqrt{2}/2 & 1/2 \end{bmatrix},$$

or:

$$H = \begin{bmatrix} 1 & 0 & 0 \\ 0 & 1 & 0 \\ 0 & 0 & 1 \\ 1/2 & -1/2 & -\sqrt{2}/2 \\ -1/2 & 1/2 & -\sqrt{2}/2 \\ \sqrt{2}/2 & \sqrt{2}/2 & 0 \\ -1/2 & -1/2 & \sqrt{2}/2 \\ -\sqrt{2}/2 & \sqrt{2}/2 & 0 \\ -1/2 & -1/2 & -\sqrt{2}/2 \end{bmatrix}.$$

Likewise, equivalent matrices may be obtained using the same methods described above. Once the positioning matrices are determined, they may then be used for configuring the MEMS compasses.

In step 806, the positioning matrix H is used for positioning the sensors, as discussed above. A MEMS sensor is generally in the shape of a rectangular cuboid with very low profile or negligible height. Thus, as shown in FIG. 7, two shaded rectangles are shown to represent the two MEMS sensors, where the z-axis of each sensor is in the direction perpendicular to the rectangle plane. The third row of each positioning matrix $H_0$ or $H_1$ represents the direction of the z-axis, and the other two rows represent the x-axis and y-axis, respectively. Thus, the rows of the matrices define the directions of the axes of the sensors and can be directly used to configure the orientation of the sensors during manufacturing.

Figure 9:
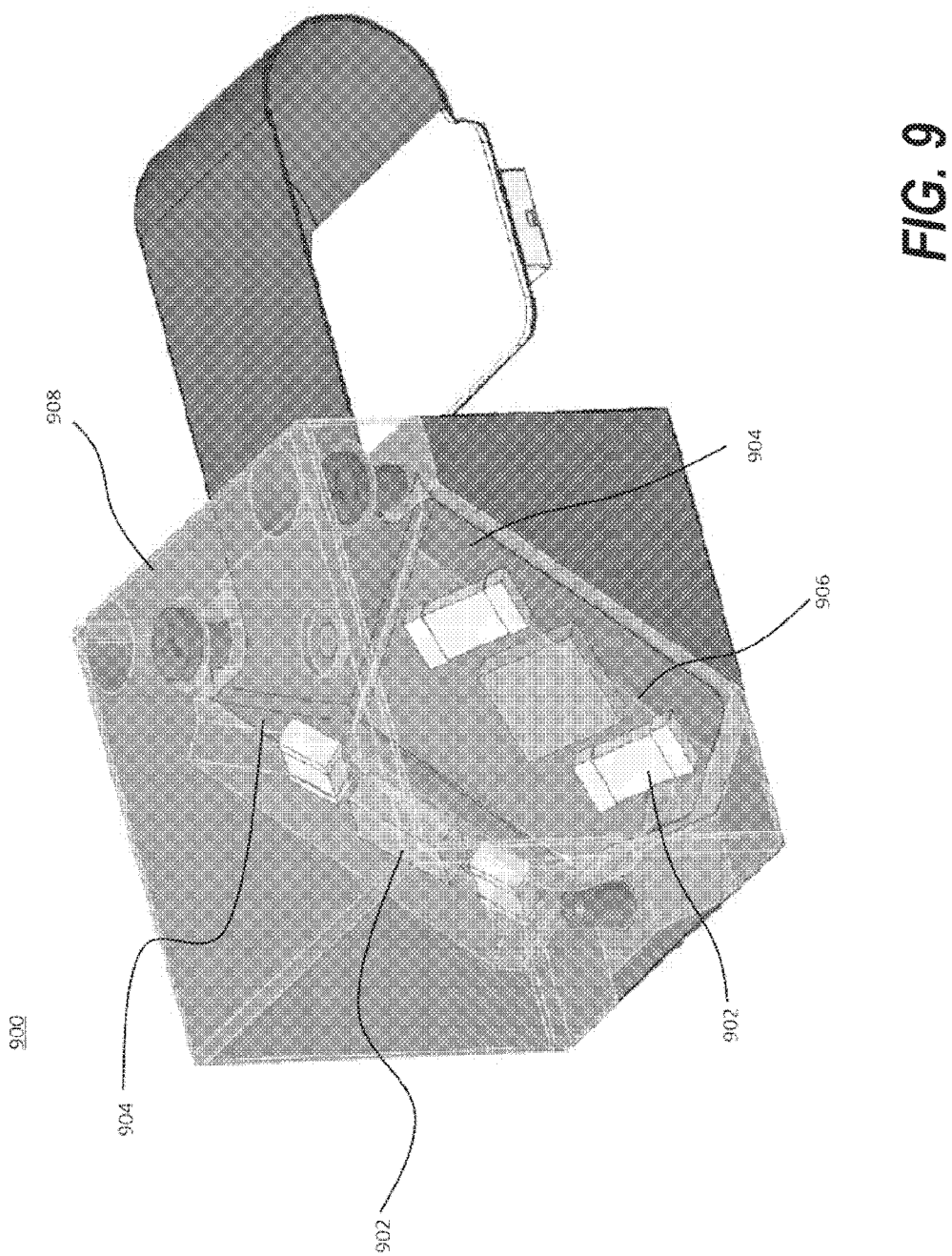
FIG. 9 illustrates an exemplary structure of a micro-inertial measurement unit with sensors mounted therein consistent with embodiments disclosed herein.

The sensors may be fixed to support structures that are themselves fixed to movable object or carrier. The support structures may be rigid support structures, such as metal substrates assembled together according to the positioning matrix H. FIG. 9 provides an exemplary MIMU structure 900, where several sensors 902 are mounted on inclined surfaces 904. The structure is of a rigid form and the sensors do not move with respect to one another once the MEW is assembled. The inclination of surfaces 904 and the orientation of sensors 902 thereon are determined by the positioning matrix H. A casing 906, made of plastic or other suitable material, secures and protects the sensors mounted on surfaces 904. In addition, MIMU structure 900 may be encapsulated in a case 908 through screws or other appropriate means. Alternatively, the sensors may also be fixed on movable support structures that can be adjusted to different positions to allow adaptation to different environments or applications. The movable structures may, for example, comprise gimbals (or micro gimbals) that can be controlled by a controller (such as a processor). Sensors mounted on the gimbals can therefore change their positions and orientations based on changes in the positioning matrix H. Movable support provides provide the flexibility of adaptability to different applications, environments, or conditions, such that a change in the environment, which may require in a change in the positioning matrix H, does not require reassembly of the components thereof.

The sensor(s) may be assembled or integrated into a navigation unit that may be later assembled into a platform (e.g., a gimbal) or vehicle (e.g., a UAV or car) to provide measurements of the state of the platform or vehicle. In one aspect, the navigation unit may be fixed. Namely, the relative positioning of the sensors in the unit cannot vary with respect to one another. In such scenario, steps 802 and 804 are performed prior to construction or assembly of the navigation device, and step 806 is performed during the construction or assembly. For example, a human being may select the requirements, and a separate processor or computer may use the algorithms associated with the selected requirements to solve for the positioning matrix. And the positioning matrix is then used in construction of the unit to position the sensor(s).

In another aspect, the navigation unit may be adaptive. In other words, the positions of the sensors may be controlled and adjusted after construction. In such scenario, requirements may be selected based on human input or detection of the environment, a processor embedded in the navigation unit or a processor embedded in the platform or vehicle in which the navigation unit is placed may solve for the positioning matrix during or before each operation, and the support structures for the sensors are controlled to adjust the positions of the sensors accordingly.

Instead of a single navigation unit, a navigation device or system consistent with embodiments of the present disclosure may also be distributed, i.e., sensors of the navigation device are spread around in the platform or vehicle. As in the single navigation unit, positioning of the sensor(s) in a distributed navigation device or system may be performed during assembly or construction of the platform or vehicle and/or during operation.

The disclosed systems and methods can improve the sensing range the motion and status of the UAV without requiring sensors with a larger operative sensing range. In addition, vibration reduction design for the navigation device can be decreased due to the oblique disposition of the sensor on the UAV and/or its carrier. In exemplary embodiments where the navigation device includes an integrated six-axis MEMS sensor (e.g., three-axis acceleration MEMS sensors and three-axis WEEMS gyroscopes) obliquely mounted on the UAV and/or its carrier, both the sensing range of acceleration and the sensing range of angular velocity of UAV can be effectively increased at the same time.

Acceleration module 56 and angular velocity module 58, also as parts of the navigation device or system, may communicate with the sensor (sensing system 18 and/or carrier sensors 30) to calculate actual (e.g., instantaneous) acceleration and angular velocity in the directions of each axis of the UAV's coordinate system by converting the angular velocities that the sensor sensed in its own coordinate system through the matrix transformation as discussed above. In these exemplary embodiments, the sensing range of acceleration and angular velocities in the UAV's coordinate system may be increased, and the conventional problems of overshoot and saturation of the MEMS gyroscope may be reduced or avoided.

The positioning matrices in the above discussions are provided as mere examples. Different matrices may be implemented to achieve similar results. And it is contemplated that when a particular positioning matrix is used to configure sensors in the navigation device, the resulting configuration may not be a precise implementation of the positioning matrix, and errors within a tolerance or margin do not affect the effectiveness of device or system.

The disclosed embodiments including redundant configurations of sensors may also be used for any combination of a plurality of integrated two-axis MEMS sensors and three-axis MEMS sensors. The sensor configurations may include planar mounting of a MEMS sensor or any other spatial mounting of MEMS sensors. Different configurations (e.g., mounting angles) can increase the corresponding acceleration/angular velocity detecting ranges along axes in the UAV coordinate system, while also improving fault tolerance and redundancy detection of acceleration/angular velocity inertial measurement information.

The disclosed embodiments of the present disclosure provide exemplary methods and systems for mounting one or more inertial measurement units on a movable object, such as a UAV, a component of a UAV, or a carrier of a UAV, to effectively increase inertia measurement range without using sensors requiring a larger operative measurement range. The disclosed embodiments also may further improve the reliability of the navigation device via a redundant configuration. For example, an integrated three-axis MEMS linear acceleration sensor is mounted on a UAV and each axis is mutually orthogonal, such that the vibration acceleration having a large magnitude in the vertical direction of UAV is decomposed into respective sensing axis of the MEMS sensor. The vibration acceleration in the vertical direction of the UAV can be obtained by synthesizing (e.g., via a transform matrix) the measured value of each sensing axis of the MEMS sensor. In this way, accelerations with high amplitudes can be measured by a sensor having a relatively lower operative sensing range, effectively expanding the acceleration sensing range of the system. When an integrated six-axis MEMS sensor is used, both the linear acceleration sensing range and the angular velocity sensing range of the UAV can be effectively increased. Further to some embodiments, by mounting the sensors redundantly on the UAV, fault tolerance of the inertial measurement system can be improved.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A movable object, comprising:
an actuator to move the movable object;
a processor configured to control the actuator and movements of the movable object; and
at least one sensor, the sensor having a coordinate system not in complete alignment with a coordinate system of the movable object,
wherein the sensor senses a state of the movable object and the processor controls the actuator and the movements of the movable object based on the sensed state,
wherein the at least one sensor comprises a multi-axis inertial measurement sensor, which measures accelerations and/or angular velocity along multiple axes of the coordinate system of the multi-axis inertial measurement sensor respectively, at least one of the multiple axes of the coordinate system of the multi-axis inertial measurement sensor is parallel to an axis of the coordinate system of the movable object, or none of the multiple axes of the coordinate system of the multi-axis inertial measurement sensor is parallel to any axis of the coordinate system of the movable object, wherein the processor obtains the measured accelerations and/or angular velocity along the multiple axes of the coordinate system of the multi-axis inertial measurement sensor and converts the measured accelerations and/or angular velocity along the multiple axes of the coordinate system of the multi-axis inertial measurement sensor into one or more of the posture, velocity, and position information of the movable object, and wherein the multi-axis inertial measurement sensor is mounted on the movable object such that a sensing range in a vertical direction in the movable object's coordinate system is greater than a sensing range along any axis of the sensor's coordinate system.

2. The movable object of claim 1, wherein the at least one sensor comprises a micro-electromechanical system (MEMS) sensor.

3. The movable object of claim 1, wherein the at least one sensor comprises one or more of a three-axis accelerometer, a three-axis gyroscope, a two-axis accelerometer, a six-axis sensor including a three-axis accelerometer and a three-axis gyroscope, or a compass.

4. A movable object, comprising:
an actuator to move the movable object;
a processor configured to control the actuator and movements of the movable object; and
at least one sensor, wherein the positioning of the at least one sensor provides for one or more of an improved navigation with information redundancy, an improved fault tolerance, and an improved measurement range in a certain direction,
wherein the at least one sensor senses the state of the movable object and the processor controls the actuator and the movements of the movable object based on the sensed state,
the at least one sensor comprises a multi-axis sensor, which measures accelerations and/or angular velocity along multiple axes of the coordinate system of the multi-axis sensor respectively, at least one of the multiple axes of the coordinate system of the multi-axis sensor is parallel to an axis of the coordinate system of the movable object, or none of the multiple axes of the coordinate system of the multi-axis sensor is parallel to any axis of the coordinate system of the movable object,
the processor obtains the measured accelerations and/or angular velocity along the multiple axes of the coordinate system of the multi-axis sensor and converts the measured accelerations and/or angular velocity along the multiple axes of the coordinate system of the multi-axis sensor into actual accelerations and/or angular velocity along multiple axis of the coordinate system of the movable object, and
the at least one sensor is positioned according to a positioning matrix H determined to provide for one or more of an improved fault tolerance and an improved measurement range in a certain direction,
wherein the positioning matrix H satisfies $$\min_{H} \max_{i} |h_i^T v|$$

to provide the improved measurement range in the v direction, where v may be any direction such as a vertical or horizontal direction in the movable object's coordinate system, $h_i$ is the i-th row of the positioning matrix H, and superscript operator T indicates the transpose of a matrix or vector, and/or the positioning matrix H satisfies $$\min_{H} \max_{i<j} |h_i^T h_j|$$

to provide the improved fault tolerance, where $h_i$ and $h_j$ are the i-th and j-th rows of the positioning matrix H, respectively, and superscript operator T indicates the transpose of a matrix or vector.

5. The movable object of claim 4, wherein the at least one sensor comprises a micro-electromechanical system (MEMS) sensor.

6. The movable object of claim 4, wherein the at least one sensor comprises one or more of a two-axis accelerometer, a three-axis accelerometer, a three-axis gyroscope, or a compass.

7. The movable object of claim 4, wherein the movable object is an unmanned aerial vehicle (UAV).

8. The movable object of claim 4, wherein the certain direction is a vertical direction.

9. The movable object of claim 4, wherein the at least one sensor comprises two or more sensors mounted on a rigid platform on the movable object.

10. The movable object of claim 4, wherein the positioning matrix H can be expressed as $$\begin{bmatrix} h_1 \\ h_2 \\ \vdots \\ h_n \end{bmatrix},$$

, where $h_1, h_2, \ldots h_n$ are vectors each defining a direction of an axis of the at least one sensor in the movable object's coordinate system.

11. The movable object of claim 4, wherein the at least one sensor is positioned according to a positioning matrix H determined to further provide for an improved navigation, and the positioning matrix H satisfies $$H^T H = \frac{n}{3} I$$

to provide the improved navigation, where I is an identity matrix, n is the total number of axes in the two or more sensors, and superscript operator T indicates the transpose of a matrix.

12. The movable object of claim 4, wherein the at least one sensor comprises two three-axis sensors, and the positioning matrix H is, within an error margin:

$$H = \begin{bmatrix} -1/\sqrt{2} & -1/\sqrt{6} & \sqrt{3} \\ -1/\sqrt{2} & 1/\sqrt{6} & -\sqrt{3} \\ 0 & -2/\sqrt{6} & -\sqrt{3} \\ 1/\sqrt{2} & 1/\sqrt{6} & \sqrt{3} \\ 0 & 2/\sqrt{6} & -\sqrt{3} \\ -1/\sqrt{2} & 1/\sqrt{6} & 1/\sqrt{3} \end{bmatrix};$$

or $$H = \begin{bmatrix} 1 & 0 & 0 \\ 0 & 1 & 0 \\ 0 & 0 & 1 \\ 1/3 & 2/3 & -2/3 \\ 2/3 & 1/3 & 2/3 \\ 2/3 & -2/3 & -1/3 \end{bmatrix}.$$

13. The movable object of claim 4, wherein the at least one sensor comprises three three-axis sensors, and the positioning matrix H is, within an error margin:

$$H = \begin{bmatrix} 1 & 0 & 0 \\ 0 & 1 & 0 \\ 0 & 0 & 1 \\ 0 & -\sqrt{2}/2 & -\sqrt{2}/2 \\ \sqrt{2}/2 & 1/2 & -1/2 \\ \sqrt{2}/2 & -1/2 & 1/2 \\ \sqrt{2}/2 & 1/2 & 1/2 \\ -\sqrt{2}/2 & 1/2 & 1/2 \\ 0 & -\sqrt{2}/2 & \sqrt{2}/2 \end{bmatrix};$$

or:

$$H = \begin{bmatrix} 1 & 0 & 0 \\ 0 & 1 & 0 \\ 0 & 0 & 1 \\ 1/2 & \sqrt{2}/2 & -1/2 \\ -\sqrt{2}/2 & 0 & -\sqrt{2}/2 \\ -1/2 & \sqrt{2}/2 & 1/2 \\ 1/2 & -\sqrt{2}/2 & 1/2 \\ \sqrt{2}/2 & 0 & -\sqrt{2}/2 \\ 1/2 & \sqrt{2}/2 & 1/2 \end{bmatrix};$$

or:

$$H = \begin{bmatrix} 1 & 0 & 0 \\ 0 & 1 & 0 \\ 0 & 0 & 1 \\ 1/2 & -1/2 & -\sqrt{2}/2 \\ -1/2 & 1/2 & -\sqrt{2}/2 \\ \sqrt{2}/2 & \sqrt{2}/2 & 0 \\ -1/2 & -1/2 & \sqrt{2}/2 \\ -\sqrt{2}/2 & \sqrt{2}/2 & 0 \\ -1/2 & -1/2 & -\sqrt{2}/2 \end{bmatrix}.$$

14. A method for positioning at least one sensor in a movable object, comprising:
identifying one or more requirements for the at least one sensor;
determining, by a processor, a positioning matrix based on the one or more requirements; and
positioning the at least one sensor based on the positioning matrix,
wherein the at least one sensor comprises a multi-axis sensor, which measures accelerations and/or angular velocity along multiple axes of the multi-axis sensor respectively, at least one of the multiple axes of the coordinate system of the multi-axis sensor is parallel to an axis of the coordinate system of the movable object, or none of the multiple axes of the coordinate system of the multi-axis sensor is parallel to any axis of the coordinate system of the movable object, and wherein the processor obtains the measured accelerations and/or angular velocity along the multiple axes of the coordinate system of the multi-axis sensor and converts the measured accelerations and/or angular velocity along the multiple axes of the coordinate system of the multi-axis sensor into actual accelerations and/or angular velocity along multiple axis of the coordinate system of the movable object through a matrix multiplication or transformation, wherein the at least one sensor is positioned according to a positioning matrix H determined to provide for one or more of an improved navigation, an improved fault tolerance, and an improved measurement range in a certain direction, wherein the at least one sensor comprises two three-axis sensors, and the positioning matrix H is, within an error margin:

$$H = \begin{bmatrix} -1/\sqrt{2} & -1/\sqrt{6} & \sqrt{3} \\ -1/\sqrt{2} & 1/\sqrt{6} & -\sqrt{3} \\ 0 & -2/\sqrt{6} & -\sqrt{3} \\ 1/\sqrt{2} & 1/\sqrt{6} & \sqrt{3} \\ 0 & 2/\sqrt{6} & -\sqrt{3} \\ -1/\sqrt{2} & 1/\sqrt{6} & 1/\sqrt{3} \end{bmatrix};$$

or $$H = \begin{bmatrix} 1 & 0 & 0 \\ 0 & 1 & 0 \\ 0 & 0 & 1 \\ 1/3 & 2/3 & -2/3 \\ 2/3 & 1/3 & 2/3 \\ 2/3 & -2/3 & -1/3 \end{bmatrix},$$

or the at least one sensor comprises three three-axis sensors, and the positioning matrix H is, within an error margin:

$$H = \begin{bmatrix} 1 & 0 & 0 \\ 0 & 1 & 0 \\ 0 & 0 & 1 \\ 0 & -\sqrt{2}/2 & -\sqrt{2}/2 \\ \sqrt{2}/2 & 1/2 & -1/2 \\ \sqrt{2}/2 & -1/2 & 1/2 \\ \sqrt{2}/2 & 1/2 & 1/2 \\ -\sqrt{2}/2 & 1/2 & 1/2 \\ 0 & -\sqrt{2}/2 & \sqrt{2}/2 \end{bmatrix};$$

or:

$$H = \begin{bmatrix} 1 & 0 & 0 \\ 0 & 1 & 0 \\ 0 & 0 & 1 \\ 1/2 & \sqrt{2}/2 & -1/2 \\ -\sqrt{2}/2 & 0 & -\sqrt{2}/2 \\ -1/2 & \sqrt{2}/2 & 1/2 \\ 1/2 & -\sqrt{2}/2 & 1/2 \\ \sqrt{2}/2 & 0 & -\sqrt{2}/2 \\ 1/2 & \sqrt{2}/2 & 1/2 \end{bmatrix};$$

or:

$$H = \begin{bmatrix} 1 & 0 & 0 \\ 0 & 1 & 0 \\ 0 & 0 & 1 \\ 1/2 & -1/2 & -\sqrt{2}/2 \\ -1/2 & 1/2 & -\sqrt{2}/2 \\ \sqrt{2}/2 & \sqrt{2}/2 & 0 \\ -1/2 & -1/2 & \sqrt{2}/2 \\ -\sqrt{2}/2 & \sqrt{2}/2 & 0 \\ -1/2 & -1/2 & -\sqrt{2}/2 \end{bmatrix}.$$

15. The movable object of claim 4, wherein the at least one sensor is mounted on the movable object such that a sensing range in a vertical direction in the movable object's coordinate system is greater than a sensing range along any axis of the sensor's coordinate system.

16. The movable object of claim 1, wherein the at least one sensor is positioned according to a positioning matrix H determined to provide for one or more of an improved navigation, an improved fault tolerance, and an improved measurement range in a certain direction, and the positioning matrix H satisfies at least one of the following conditions:

the positioning matrix H satisfies $$\min_{H} \max_{i} |h_i^T v|$$

to provide the improved measurement range in the v direction, where v may be any direction such as a vertical or horizontal direction in the movable object's coordinate system, $h_i$ is the i-th row of the positioning matrix H, and superscript operator T indicates the transpose of a matrix or vector, the positioning matrix H satisfies $$H^T H = \frac{n}{3} I$$

to provide the improved navigation, where I is an identity matrix, n is the total number of axes in the two or more sensors, and superscript operator T indicates the transpose of a matrix, or the positioning matrix H satisfies $$\min_{H} \max_{i<j} |h_i^T h_j|$$

to provide the improved fault tolerance, where $h_i$ and $h_j$ are the i-th and j-th rows of the positioning matrix H, respectively, and superscript operator T indicates the transpose of a matrix or vector.

17. The method of claim 14, wherein the at least one sensor comprises one or more of a two-axis accelerometer, a three-axis accelerometer, a three-axis gyroscope, or a compass.

18. The method of claim 14, wherein the movable object is an unmanned aerial vehicle (UAV).

19. The method of claim 14, wherein the at least one sensor is mounted on the movable object such that a sensing range in a vertical direction in the movable object's coordinate system is greater than a sensing range along any axis of the sensor's coordinate system.

* * * * *